(12) United States Patent
Schlak

(10) Patent No.: US 9,540,998 B2
(45) Date of Patent: Jan. 10, 2017

(54) INTEGRAL GAS TURBINE, FLYWHEEL, GENERATOR, AND METHOD FOR HYBRID OPERATION THEREOF

(75) Inventor: Daniel Keith Schlak, Alexandria, VA (US)

(73) Assignee: Daniel K. Schlak, Alexandria, VA (US)

( * ) Notice: Subject to any disclaimer, the term of this patent is extended or adjusted under 35 U.S.C. 154(b) by 16 days.

(21) Appl. No.: 13/506,962

(22) Filed: May 29, 2012

(65) Prior Publication Data

US 2013/0139515 A1 Jun. 6, 2013

Related U.S. Application Data

(60) Provisional application No. 61/457,755, filed on May 27, 2011.

(51) Int. Cl.
| | | |
|---|---|---|
| F02C 3/00 | (2006.01) |
| F01D 15/02 | (2006.01) |
| F01D 15/10 | (2006.01) |
| F02C 5/02 | (2006.01) |
| F02C 6/16 | (2006.01) |
| F02C 7/36 | (2006.01) |
| F02C 7/08 | (2006.01) |

(52) U.S. Cl.
CPC ............... *F02C 3/00* (2013.01); *F01D 15/02* (2013.01); *F01D 15/10* (2013.01); *F02C 5/02* (2013.01); *F02C 6/16* (2013.01); *F02C 7/08* (2013.01); *F02C 7/36* (2013.01); *F05D 2220/90* (2013.01); *Y02T 50/671* (2013.01)

(58) Field of Classification Search
CPC ................. F02C 6/16; F02C 7/08; F02C 7/36
USPC ..... 60/39.17, 727, 39.511, 39.43, 39.41, 788, 60/39.42
See application file for complete search history.

(56) References Cited

U.S. PATENT DOCUMENTS 2,767,809 A * 10/1956 Sutter ............... B60B 39/00
188/4 B
3,097,485 A * 7/1963 Bidwell ............. F02C 6/20
60/787

(Continued)

OTHER PUBLICATIONS

HowStuffWorks Alternator Components Josh Briggs Jun. 2008 http://auto.howstuffworks.com/alternator2.htm.*

(Continued)

*Primary Examiner* — Gerald L Sung
*Assistant Examiner* — William Breazeal

(57) ABSTRACT

A power plant incorporating attributes of a gas turbine engine, flywheel, and electrical generator (hereafter turbine/flywheel or TF) in a single compact unit, having a compressor arrayed with magnets which weight the periphery of the TF. Intermittent combustion periods accelerate the TF to a first rotational velocity, then combustion ceases, and the inlet/outlet of the TF are sealed, causing it to self-evacuate. Conductive coils surround the TF. Magnetic flux between the magnets and coils acts as a motor/generator, electrically powering a load, and absorbing electrical power therefrom via regenerative braking; power out decelerating the TF (now a flywheel), power in accelerating it. A pressure accumulator accepts the TF exhaust, and is pressurized by the combustion periods. Between combustion periods, exhaust in the accumulator expands in a small pump/motor that drives a generator, routing electricity to the TF to raise its rotational velocity.

35 Claims, 15 Drawing Sheets

(56) References Cited

U.S. PATENT DOCUMENTS

| | | | | |
|---|---|---|---|---|
| 3,264,482 | A | * | 8/1966 | Clark ................. F01D 15/10 |
| | | | | 290/38 A |
| 3,283,497 | A | * | 11/1966 | Kaplan ........................ 60/743 |
| 3,316,713 | A | * | 5/1967 | Urban ..................... 60/39.281 |
| 3,369,361 | A | * | 2/1968 | Craig ................... F02C 6/006 |
| | | | | 60/39.41 |
| 3,613,360 | A | * | 10/1971 | Howes .................. F23R 3/54 |
| | | | | 60/755 |
| 3,826,096 | A | * | 7/1974 | Hrusch ................. F02C 6/06 |
| | | | | 60/656 |
| 3,923,115 | A | | 12/1975 | Helling |
| D238,937 | S | | 2/1976 | Szakacs |
| 4,077,748 | A | | 3/1978 | Potz |
| 4,157,011 | A | * | 6/1979 | Liddle .................. F02C 6/14 |
| | | | | 180/301 |
| 4,163,367 | A | | 8/1979 | Yeh |
| 4,222,234 | A | | 9/1980 | Adamson |
| 4,252,208 | A | | 2/1981 | Heidemeyer et al. |
| 4,254,617 | A | * | 3/1981 | Papsdorf ................ F02C 3/22 |
| | | | | 137/533.17 |
| 4,270,344 | A | | 6/1981 | Yu |
| 4,361,204 | A | | 11/1982 | Earle |
| 4,414,805 | A | | 11/1983 | Walker |
| 4,525,631 | A | | 6/1985 | Allison |
| 4,570,438 | A | * | 2/1986 | Lorenz .................... 60/39.39 |
| 4,709,879 | A | | 12/1987 | Stafford |
| 5,065,833 | A | | 11/1991 | Matsuoka et al. |
| 5,123,613 | A | | 6/1992 | Piasecki |
| 5,163,638 | A | | 11/1992 | Chaneac |
| D331,893 | S | | 12/1992 | Szakacs |
| 5,174,109 | A | * | 12/1992 | Lampe ........................ 60/788 |
| 5,246,188 | A | | 9/1993 | Koutsoupidis |
| D340,426 | S | | 10/1993 | Miller |
| 5,277,381 | A | | 1/1994 | Piasecki |
| 5,341,060 | A | | 8/1994 | Kawamura |
| 5,379,589 | A | * | 1/1995 | Cohn .................... F01B 17/00 |
| | | | | 60/39.59 |
| 5,433,400 | A | | 7/1995 | Singhal et al. |
| 5,435,502 | A | | 7/1995 | Wernicke |
| 5,460,239 | A | | 10/1995 | Jensen |
| 5,568,023 | A | | 10/1996 | Grayer et al. |
| 5,584,174 | A | | 12/1996 | Bates et al. |
| 5,584,673 | A | | 12/1996 | Rein |
| 5,607,329 | A | | 3/1997 | Cho et al. |
| 5,649,811 | A | | 7/1997 | Krol et al. |
| 5,826,673 | A | | 10/1998 | Bates et al. |
| 5,831,341 | A | | 11/1998 | Selfors et al. |
| 5,893,423 | A | | 4/1999 | Selfors et al. |
| 5,931,249 | A | | 8/1999 | Ellis et al. |
| 6,044,924 | A | | 4/2000 | Adli |
| 6,054,838 | A | | 4/2000 | Tsatsis |
| 6,105,364 | A | | 8/2000 | Zdybel |
| 6,153,943 | A | * | 11/2000 | Mistr, Jr. ..................... 290/52 |
| 6,169,332 | B1 | | 1/2001 | Taylor et al. |
| 6,194,798 | B1 | | 2/2001 | Lopatinsky |
| 6,508,324 | B1 | | 1/2003 | Conley, Jr. |
| 6,568,186 | B2 | * | 5/2003 | Zaleski ........................ 60/698 |
| 6,629,573 | B1 | | 10/2003 | Perry |
| 6,914,344 | B2 | * | 7/2005 | Franchet et al. ................ 290/52 |
| 6,931,856 | B2 | | 8/2005 | Belokon et al. |
| 7,021,905 | B2 | | 4/2006 | Torrey et al. |
| 7,073,335 | B2 | | 7/2006 | Gerdes et al. |
| 7,104,498 | B2 | | 9/2006 | Englar et al. |
| 7,364,115 | B2 | | 4/2008 | Parks et al. |
| 7,387,182 | B2 | | 6/2008 | Fleming |
| 7,410,123 | B2 | | 8/2008 | Nunnally |
| 7,444,944 | B2 | | 11/2008 | Kumar et al. |
| 7,462,019 | B1 | | 12/2008 | Allarie et al. |
| 7,900,455 | B2 | | 3/2011 | Althaus et al. |
| 7,952,244 | B2 | | 5/2011 | Colin |
| 7,973,421 | B2 | | 7/2011 | Sharp |
| 7,980,058 | B2 | | 7/2011 | Chang |
| 8,056,665 | B2 | | 11/2011 | Leonard et al. |
| 8,079,437 | B2 | | 12/2011 | Rosman |
| 8,146,369 | B2 | | 4/2012 | Walitzki et al. |
| 8,215,437 | B2 | | 7/2012 | Watson et al. |
| 2002/0139894 | A1 | | 10/2002 | Sorensen |
| 2002/0194832 | A1 | * | 12/2002 | Smith ...................... 60/39.182 |
| 2003/0170115 | A1 | * | 9/2003 | Bowen et al. ................ 415/160 |
| 2006/0225431 | A1 | * | 10/2006 | Kupratis ........................ 60/791 |
| 2007/0029803 | A1 | * | 2/2007 | Randall ................ F01D 15/10 |
| | | | | 290/52 |
| 2008/0272597 | A1 | * | 11/2008 | Althaus ................ F01D 19/00 |
| | | | | 290/52 |
| 2009/0071734 | A1 | | 3/2009 | Hurkett |
| 2009/0126369 | A1 | * | 5/2009 | Walitzki ................ F02C 7/268 |
| | | | | 60/787 |
| 2010/0122864 | A1 | | 5/2010 | Rosman |
| 2010/0127496 | A1 | * | 5/2010 | Burkholder et al. ........... 290/46 |
| 2010/0154410 | A1 | | 6/2010 | Raychinov |
| 2010/0280698 | A1 | | 11/2010 | Ichikawa |
| 2010/0288571 | A1 | * | 11/2010 | Dewis et al. ................ 180/165 |
| 2011/0147105 | A1 | | 6/2011 | Dimitrov et al. |
| 2011/0277442 | A1 | * | 11/2011 | Drobniak ............ B01D 46/001 |
| | | | | 60/39.092 |
| 2012/0126539 | A1 | | 5/2012 | Jacob |

OTHER PUBLICATIONS

The Britannica Guide to Inventions That Changed the Modern World Britannica Educational Publishing 2009 p. 168, 169 under Heading Modern Steam Turbines.*
NASA "Engines", Jul. 2, 2010, http://www.grc.nasa.gov/WWW/K-12/UEET/StudentSite/engines.html.*
GE Power Systems Oil & Gas, "Turbine Starting System Improvement", 2002, http://site.ge-energy.com/businesses/ge_oilandgas/en/prod_serv/serv/downloads/turb_start_imp.pdf.*
Singh "Applied Thermodynamics", 2003, New Age International.*
Irimescu "Thermodynamics analysis gas turbine powered cogeneration systems", 2010, Journal of Scientific and Industrial Research p. 1, http://nopr.niscair.res.in/bitstream/123456789/9859/1/JSIR%2069(7)%20548-553.pdf.*
Blueyonder "gasturbinepwp", 2002, http://www.gasturbine.pwp.blueyonder.co.uk/chapter1.htm.*
LeDuc, "Power to the Water", 2002, http://www.dieselduck.info/machine/02%20propulsion/shafting/index.htm.*
Langston, "Introduction to Gas Turbines for Non-Engineers", 1997, Global Gas Turbine News,vol. 37: No. 2, p. 2, http://files.asme.org/IGTI/Knowledge/Articles/13051.pdf.*
GE Power Systems Oil & Gas "Turbine Starting System Improvement", 2002, http://site.ge-energy.com/businesses/ge_oilandgas/en/prod_serv/serv/downloads/turb_start_imp.pdf.*
NASA "Engines", 2010, http://www.grc.nasa.gov/WWW/K-12/UEET/StudentSite/engines.html.*

* cited by examiner

| | | 77 | 124 | 132 |
|---|---|---|---|---|
| 140 | High Pressure | a | a | a |
| 141 | Moderate Pressure | b | a | a |
| 142 | Low Pressure | b | b | b |
| 143 | Very Low Pressure | b | b | c |
| 144 | High-Consumer (Non-Hybrid) | a | b | c |
| 145 | Heavy Braking | b | b | c |

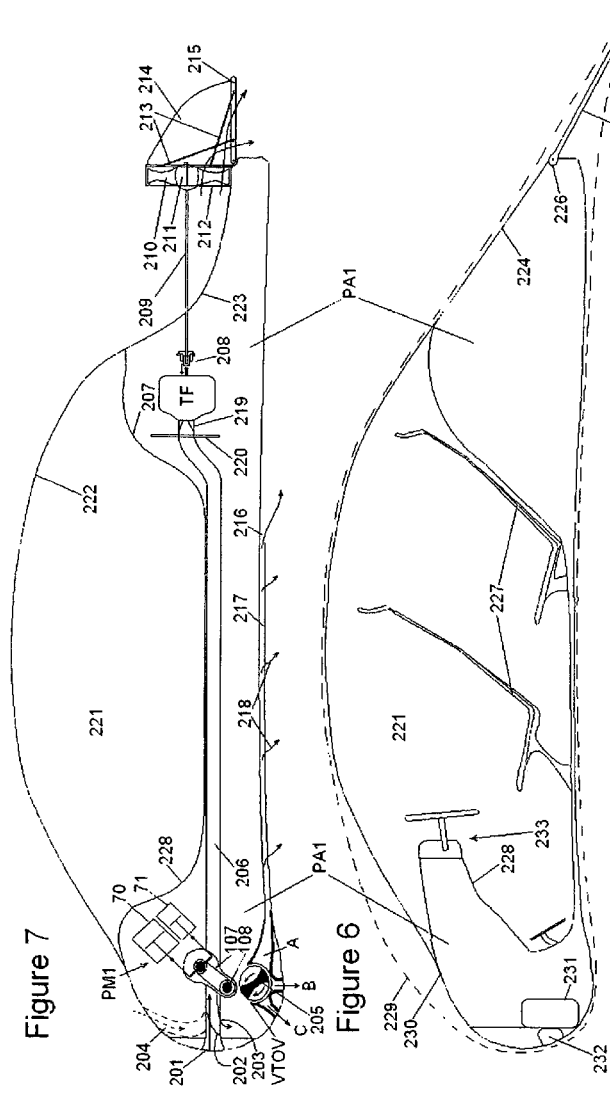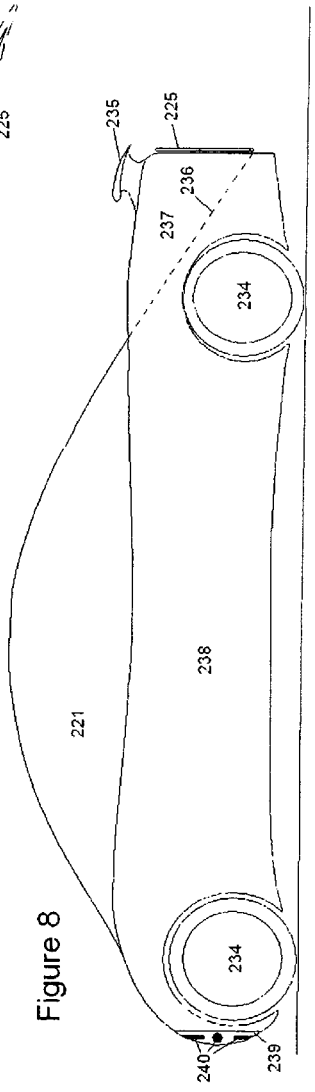

Fig. 11

System Chronology for Hybrid Operation – Method Steps

1 – Start-up (note: PA1 is partially charged prior to start-up due to final step of shutdown)

| Step | Description |
|---|---|
| 1-1 | Depressurize pressure-accumulator PA1 through reversible pump-motor PM1 |
| 1-2 | Route generated electricity from PM1 to conductive coils (i), accelerating TF |
| 1-3 | Open inlet and outlet of TF |
| 1-4 | Commence combustion in combustor C |

2 – Run-up and Hybrid Operation with P>Pmin

| Step | Description |
|---|---|
| 2-1 | Combust until $\omega 1$ (TF rotational velocity 1) and P1 are reached (load can be energized at this time) |
| 2-2 | When P=P1, close inlet and outlet of TF |
| 2-3 | Compressors and turbines self-evacuate with assistance from pump and relieved (open) bias-seals |
| 2-4 | Slowly expand gases in PA1 through PM1 (currently a motor-generator), electrically accelerating TF |
| 2-5 | Deceleration of TF via energization of Load L |
| 2-6 | Acceleration of TF via braking of Load L |
| 2-7 | Successive reiteration of steps 2-5 AND 2-6 until P=Pmin (or insufficient upcoming brakings foreseen) |
| 2-8 | Meanwhile, during quick-stops (brake-force required larger than reverse load capacity of load L): Reverse PM1 (now a pump), utilizing supplemental brake-force to draw ambient air into PA (Supplemental braking requirements excessive) Activate service brake |
| 2-9 | WHEN P=Pmin OR $\omega 1 = \omega 1 min$ (or insufficient upcoming brakings foreseen) – GO TO STEP 1-3 |

3 – Shutdown/Parking

| Step | Description |
|---|---|
| 3-1 | Close (if open) inlet and outlet of TF |
| 3-2 | Route electrical energy from TF to PM1 |
| 3-3 | Reverse PM1 to pump ambient air into PA |
| 3-4 | When $\omega 1=0$, close PM1 – resulting in hermetically sealed PA with sufficient charge to begin step 1 |

Figure 12

Transition to High Consumer Mode – Virtual Clutch

4 – Starting from road travel with moderate ω at decision moment (i.e. typical highway lift-off)

| Step | Description |
|---|---|
| 4-1 | Close (if open) PM1, sealing PA1 (vertical take-off valve VTOV already closed) |
| 4-2 | Open (if not already open) inlet and outlet of TF and commence combustion (if not already combusting) |
| 4-3 | While P increases to Pmax, direct all electrical energy from TF to load L, accelerating vehicle |
| 4-4 | When P=Pmax, cease combustion, close inlet and outlet of TF, open fan F inlet and flap panel to idle fan |
| 4-5 | Electrically transfer all kinetic (rotational) energy from TF module 1 (TFM1) to TF module 2 (TFM2) and L |
| 4-6 | When TFM1 and F are rotationally matched (via reduction gearing ratio), slide collar over trunnion |
| 4-7 | Open PM1 to maximum throughput, transfer all energy from PM1 and TFM2 to TFM1 and L (until/unless vehicle velocity is near lift-off velocity, then deactivate L for duration of flight) |
| 4-8 | Open inlet and outlet to TF, commence combustion, positively drive F at lift-off thrust |
| 4-9 | Although PM1 is still at max throughput, P will quickly reach Pmax |
| 4-10 | Selectively open vertical take-off valve VTOV to position A to complement fan thrust and to waste-gate PM1 |
| 4-11 | If advantageous, momentarily (or for duration of lift-off) rotate VTOV partially/fully to position B and vertical take-off flap VTOF partially/fully upright to achieve "pop up" effect |

5 – Starting from road travel with excessive ω at decision moment (i.e. atypical highway lift-off)

| Step | Description |
|---|---|
| 5-1 | Reverse PM1 (now a pump) and slow TF electrically via PM1 and L, charging PA1 and accelerating vehicle |
| 5-2 | When possible, open inlet and outlet of TF without combustion, further charging PA1 and slowing TF |
| 5-3 | When ω falls to predetermined rate, commence combustion |
| 5-4 | GO TO STEP 4-3 |

6 – VTO with moderate ω (i.e. heliopad/driveway lift-off)

| Step | Description |
|---|---|
| 6-1 | Down flap panel, open fan inlet, open inlet and outlet of TF, commence combustion, charging PA1 |
| 6-2 | Direct some electrical energy from TF to reversed PM1 (now a pump), further charging PA1 |
| 6-3 | When P=Pmax, cease combustion, close inlet and outlet of TF, close PM1 |
| 6-4 | Electrically transfer all kinetic (rotational) energy from TF module 1 (TFM1) to TF module 2 (TFM2) and L |
| 6-5 | Service brake applied (connect to front axle, PM1 pistons connect to generator) anytime prior to step 6-7 |
| 6-6 | When TFM1 is completely stopped, slide collar over trunnion, raise VTOFs to near-upright (fan nozzled down) |
| 6-7 | Open inlet and outlet to TF, commence combustion, continue to reverse PM1 via electricity from TF |
| 6-8 | When P=Pvto, quickly cycle VTOV to position C and switch to thrust reverser on front inlet |
| 6-9 | One VTOF has been left horizontal to keep down-thrust just shy of lift-off. It is now raised parallel to the others |

7 – VTO with high ω (i.e. traffic lift-off)

| Step | Description |
|---|---|
| 7-1 | Reverse PM1 (now a pump) and slow TF electrically via PM1, charging PA1 |
| 7-2 | When ω falls to predetermined rate, GO TO STEP 6-1 |

Fig. 13

(Continuation of Figure 12)

8 – Pre-planned or taxi-to-runway flight (since significant fuel is consumed by VTO, this may be common)

| Step | Description |
|---|---|
| 8-1 | Perform steps 1-1 through 2-7 until on straightaway/runway, then perform steps 4-1 through 4-11 |
| 8-2 | With (GPS) knowledge of route (user's home and favorite lift-off), the computer can optimize fuel usage |

9 – Road landing

| Step | Description |
|---|---|
| 9-1 | Obtain altitude and alignment just above roadway, level out and run TF and F at cruise |
| 9-2 | Raise the central VTOF, or two outermost VTOFs, partway, to partially vector the thrust down |
| 9-3 | Simultaneously with 9-2, cycle VTOV to position B. |
| 9-4 | Loss of thrust in 9-2 and 9-3 reduces lift. Vehicle descends onto air cushion created by downward thrust. |
| 9-5 | Several inches above roadway, level VTOFs and retract (toward fan) flap panel. Rear wheels touch down. |
| 9-6 | A moment behind step 9-5, cycle VTOV closed and cease combustion. Front wheels touch down. |
| 9-7 | Slide collar off trunnion, close fan inlet |
| 9-8 | Braking load drives TF to high $\omega$, GO TO STEP 2-5 |
| | (it is uncertain at this time when, whether, and how PM1 should be utilized during this procedure) |

10 – Vertical landing

| Step | Description |
|---|---|
| 10-1 | Obtain approach position, attitude, and altitude |
| 10-2 | Cycle VTOV to position B and all VTOF's to max upright position, vectoring all thrust and exhaust downward |
| 10-3 | Pitch/roll/yaw nozzles PRYNs and TF driven selectively to stabilize speed, lift, pitch, roll, and yaw |
| 10-4 | Vehicle coasts through a deceleration and descent curve to arrive mostly slowed, above and just shy of LZ |
| 10-5 | Cycle VTOV to position C and switch to thrust reverser on front inlet, bring horizontal velocity to zero above LZ |
| 10-6 | Attenuate fuel-in until touchdown |
| 10-7 | Slide collar off trunnion, close VTOV, retract (toward fan) flap panel, close fan inlet |
| 10-8 | GO TO EITHER STEP 2-1 (to taxi or drive) OR STEP 3-1 (to park) |

11 – Other features

| Step | Description |
|---|---|
| 11-1 | With GPS device, system can begin shedding energy a certain distance from one's destination |
| 11-2 | Docking station plug-ins allow vehicle to depart with maximum $\omega$ and P, such that lift-off happens fully fueled |

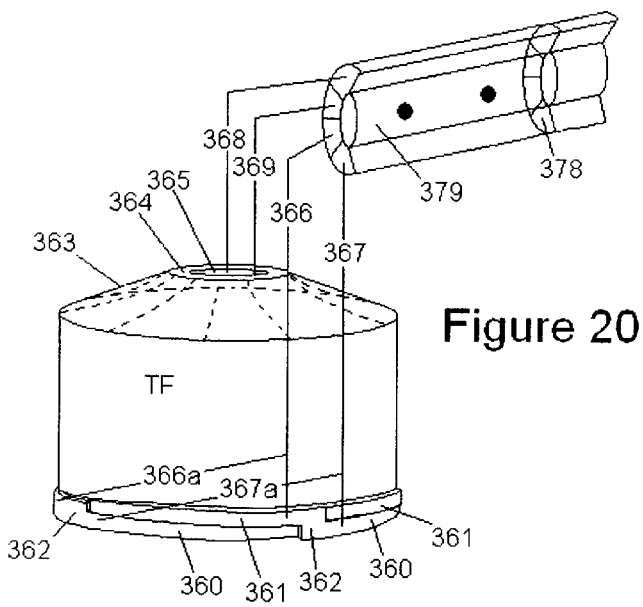
Figure 20
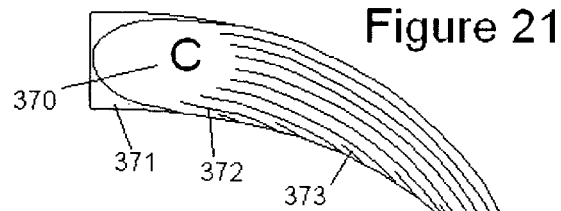
Figure 21
Figure 22
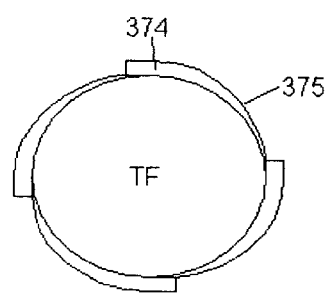

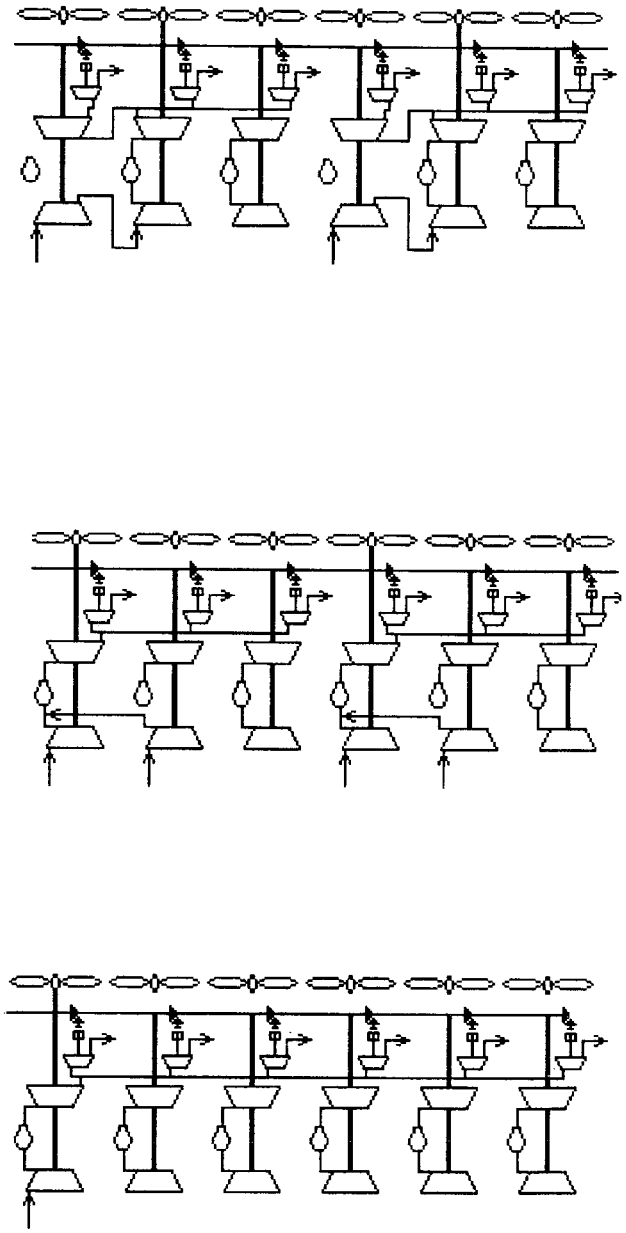

INTEGRAL GAS TURBINE, FLYWHEEL, GENERATOR, AND METHOD FOR HYBRID OPERATION THEREOF

RELATED APPLICATIONS

This application claims priority of U.S. Provisional Application Ser. No. 61/457,755, filed May 27, 2011, entitled "Integral Gas turbine, Flywheel, Generator, and Method for Hybrid Operation Thereof".

BACKGROUND SUMMARY

Power plants typically produce peak power within a single prescribed operating range. This range is a design specification and invariably operation outside it is undesired. In instances requiring high power production, performance while underloaded is a secondary consideration and often the inefficiencies associated therewith are written off, as negligible in some instances such as wherein underloaded conditions are only encountered at the beginning and end of a long cycle. In some applications, the upper loading range can be an order of magnitude, or more, higher than the underloaded range. It is the inventor's understanding that the prior art is insufficient in offering a single power plant offering plural optimal operating ranges wherein the ranges are widely disparate in nature and wherein the power plant and the system comprised thereof are adequately small, lightweight, and simple.

Hybrid systems have shown to be, thus far, the most efficient method of operating machinery, particularly vehicles. However, hybrid systems inherently incorporate multiple modules, each with its corresponding mass, volume, and complexity. Flywheels and batteries can be as massive as the prime movers they complement. In an effort to design purely complementary systems, the prime mover is constructed to be as small and light as possible, and the volumetric flow of combustion gases therethrough restricted to as little as possible, for reasons known to practitioners in the art. The maximum output is limited in such cases to the sum of energy stored and energy from the prime mover. Too often this is far insufficient, leaving industry with no non-hybrid choice but to waste considerable energy using a large engine to operate in the underloaded state, or fit a single piece of machinery with two prime movers. The hybrid solutions utilized to obviate these wasteful scenarios are complex and inordinately cumbersome. Although in certain applications theoretical optimizations of energy can be reached, the resulting masses and sizes of the resulting machines are simply out of consideration in many fields of endeavor.

Specifically in dealing with high-power hybrid systems, a not uncommon example is the combination of an energy-storage mechanism with a turbine. Complexity and additional mass and size result from efforts to selectively engage one to the other, and both and/or one to the driven means. Also, considerable energy is wasted in the intermittent starting from standstill of the turbine. The most glaring drawback, however, is the fact that there are necessarily entailed three means; one for energy creation, one for energy storage, and one for energy transmission. In many uses this does not matter much, for the machinery that use the devices are slow, stationary, and/or off-road, such that size is not of issue, and, as mentioned, they are hybrid, such that energy put into acceleration of the superfluous mass is reclaimed during deceleration. However, there is still felt a need in the art for an equivalent system that is lighter, smaller, and faster.

SUMMARY OF THE INVENTION

Disclosed is a power plant incorporating the attributes of a gas turbine engine, flywheel, and generator (hereafter "TF") in an integral unit of remarkable compactness, obviating prior art solutions providing three disparate units, consequently reducing the overall weight and volume of hybrid systems. Also disclosed is machinery or a vehicle for use with the TF comprising a pressurized chamber, or pressure accumulator, and supplemental electrical and pressurized apparatus which cooperate to effect a method typically embodied by:

a) a low-power, hybrid mode characterized by high efficiency; and b) a high-power mode characterized by high torque.

Various (i.e. compressor, turbine) stages of the TF are arrayed with magnetized elements. The elements could represent a core of each rotor blade, being overlaid with a harder, sturdier material, or, if feasible, the blades themselves. Also envisioned are, in lieu of the foregoing or supplemental thereto, magnetized elements in other places, so long as those places are areas of high velocity near stationary (stator) locations capable of interacting with the elements. Coils are placed within said stationary locations and the electrons within them experience electromotive force due to the magnetic flux caused by passing magnets, creating energy. Conversely, movement of the electrons in the coils due to external electromotive forces causes physical acceleration and deceleration of the magnets.

The utilization of the TF as a flywheel is thus inherent. Intermittent periods of combustion in the combustion chambers accelerate the TF to a first speed and then combustion ceases. The intake and exhaust paths of the TF are hermetically sealed. The TF, via means to be described later, continues to force air toward the combustor, whence it is withdrawn by a small pump, thereby effectively evacuating the TF and allowing it to spin with negligible drag. Electrical energy is drawn out of and into the rotating TF, decelerating it and accelerating it, respectively. Frequency and duration of the periods of combustion will be determined to disallow the rotational inertia of the TF falling below a level known to be minimal for power demands from consumers, and/or for unaided restart of the combustion process (in fact, due to the inherent method, a starter is obviated altogether).

The exhaust passed downstream from the final turbine stage is accumulated in a pressure accumulator, preferably a large one representing the majority of the machine/vehicle not needed to support life. The exhausted air will be so lean (depleted) that it should surround the fuel tanks, motors, etc., such that the machine/vehicle and its constituent parts cannot of themselves combust.

The accumulator will pressurize with exhaust until a certain pressure exists, at which point it is cut off from the TF via the latter's being hermetically sealed. The exhaust slowly expands (to environment) in a small reversible pump/motor or turbine which drives a shaft which turns a small, typical motor/generator. All pressures within the TF will atrophy to less than one atmosphere.

Said small motor/generator, magnets/coils of the TF, motors (i.e. traction motors of a vehicle), and other conceived consumers communicate electricity, via respective transformers, inverters, converters, and so forth, along a DC bus.

In a preferred embodiment, a novel gas turbine power plant is used to complement the nature of the hybrid operation, and consists of an everted flow-path with the turbine stages disposed radially inwardly of the compressor stages. The first compressor stage and second turbine stage are of the centrifugal type, providing the highest possible head over the shortest axial length, and effecting narrow, combined, concentrically paired ducts for the intake and exhaust. In other words, the TF exhausts and intakes from the same end, the exhaust and intake are parallel and concentric, and the combustion is at the other end. By careful placement of all intervening items, the entire system should be capable of fabrication to dimensions not in excess of 2.5 feet in any direction, enabling its placement within a passenger vehicle or other environment where size is restricted. Also, proper material selection should result in a mass not much higher than a typical hybrid vehicle. However, larger, more or less massive versions could be utilized in heavy machinery, large vehicles, water- and air-craft, etc.

One thing should be pointed out concerning the novel power plant geometry. All stages are arranged to, when the main unit is sealed off, force air toward the combustor. With proper placement of bypass valves—specifically inter-stage seals that automatically leak when a pressure-drop across them falls below a threshold—the power-plant, not only efficient in its use of space, evacuates itself much more quickly from a single bleed point (preferably in the combustor) than traditional (linear axial) systems ever could, further reducing the number of moving parts. Again, the TF charges an accumulator, the pressure in the accumulator drives a pump, the pump, TF, and utility motors direct electrical energy away from and toward each other along a DC bus. A heat exchanger directs the initial intake air past the air traveling from the last turbine stage to the accumulator. Further, a recuperator can be advantageously positioned to heat the combustor inlet with a turbine outlet. The recuperator, the heat exchanger, and supplemental heat exchanges inside the accumulator, such as the heating of fuel, should sufficiently cool the exhaust air so that it does not harm the chamber, which is desired since the materials best suited for the accumulator due to their tensile-strength-to-weight ratios decompose at high temperatures.

During sustained high power output all available power is directed to the compressor/turbine module attached to a main drive shaft. In the preferred embodiment, the first turbine stage produces work whose sum is delivered to said shaft after having the work of the axial compressor stages subtracted therefrom. Also, in the preferred embodiment, the second turbine group, of the centrifugal type, drives the first compressor, also of the centrifugal type. This stage has also associated therewith its own corresponding magnets and coils, and as it rotates freely, in a preferred embodiment, of the main module, its power will be fed in the form of electricity to the magnets of the main module, and thereby, to said main shaft. Additionally, the downstream, post-chamber reversible pump/motor or turbine, will no longer expand the accumulated exhaust slowly, but will be run up to a maximum speed, while the transformer associated with its corresponding electrical generator, of the variable type, will have its ratio changed (as would a mechanical transmission, its ratio should always be varied to allow the generator, when the generator drives the TF, an electromechanical advantage; likely this could be effected by constantly varying the number of coils connected in series on the toroid) to match the now rapidly turning and highly torqued shaft associated with the generator. In this way the constant stream of exhaust into the chamber can be dealt with and its high pressure utilized for optimal power production. The pump/motor can also be wastegated by another system within the machine. Consequently, this considerable electrical power produced by the reversible pump/motor or turbine will be fed, via the generator and transformer, to said magnetized vanes of the main (axial) compressor, the confluence of it with said EMF from the turbo-charging stage will further torque the main shaft, complementing the physical torque from the first turbine stage, such that, although the turbines and other producers of energy are spread about the overall system, the shaft transmits, selectively or not, all available power to the high-output consumer.

An electrical control system will selectively connect (as well as convert, invert, and/or transform, as needed) each driven and drivable element with the DC bus, via prior-art means. An AC bus is not unforeseen, however due to the inflexibility associated with its embodiment, it would disallow the independence of all the systems, and would therefore be difficult to realize in a dynamic system, without extensive control provisions. For static systems, with masses, volumes, geometries, and electrical components matched for a predetermined energy production, alternating current could be preferred.

However, the advantage of the DC bus is that it obviates transmissions and clutches, and any shafts, axles, gears, levers, housings, collars, and cooling and lubricating systems associated therewith. A control system will actuate small switches and corresponding governors of current, such that the consumers and producers always operate at the most efficient, or demanded, speed and torque. For the TF during flywheel stage, this speed is much higher than is achievable by the fluid reaction on the turbine vanes. The traction motors can decelerate the vehicle (if it is a vehicle the system is being used in) or accelerate it, regardless of speed of the vehicle, and the TF can always be accelerated, despite the fact that it might already be rotating very quickly, as the torque on the main compressor/turbine group will always be proportional to voltage applied, since the incoming electrical energy will always be oscillated with a frequency, and timing, perfectly attuned. The methods for doing this are well known in the electrical arts.

Thus, pursuant to the forgoing, the reversible pump/motor or post-chamber turbine can be embodied by just about any combination of expanders. It is known, particularly from steam turbine and other stationary power-plant application, that the higher the number of turbines and heat exchangers, the better; in other words, the asymptudinal theoretical limit on efficiency can only be approached via a nearly infinite array of turbines and heat exchangers/engines. The enthalpy escaping the combustor requires near-infinite successive mechanisms to extract all kinetic and heat energies, or finite mechanisms and infinite time. Clearly there is a trade-off involved in the field of endeavor of the instant application, weight and volume vs. un-extracted enthalpy. Infinite time is the key to comprehending the initiative of the invention.

Since the instant invention provides for cooling between the exhaust from the TF and the post-chamber expander(s), the material requirements for the latter are eased; not only via the parallel-flow heat exchanger envisioned and described below, but also via a recuperator that is inherent in the geometry of the TF's preferred embodiment, and some residual heat losses. The enthalpy of the exhaust, at the point it arrives to the reversible pump/motor or post-chamber turbine, is disproportionately represented by kinetic (pressure) energy, the heat energy having been mitigated to acceptable levels and no longer deleterious to downstream matter (but if not, additional heat exchangers could be utilized, or even a heat pump, the energy of the latter routed the way, via electricity, of all the other energies of the system, for the temperature of the post-chamber air will only be a problem during high-output, non-intermittent operation). The disproportionately kinetic nature of the enthalpy can be nonetheless rendered, and to what extent it can be rendered is the subject of Appendix I.

Any of a-aj from Appendix I can be used to drive either along a single shaft or other mechanical means a single generator or multiple generators, or via multiple shafts or other mechanical means a single generator or multiple generators. Additionally, the generator or generators aforementioned can receive power from the DC bus to drive, either in reverse or through a reversing assemblage of valves or variable vanes, said one or a combination of items a-aj, to charge the chamber. The simplest embodiments of a-g will be dealt with in the description of the preferred embodiments, and their foreseen combinations as per h-aj should be seen as serial, or parallel, co-utilizations not incomprehensible, unimaginable, or unobvious to one of ordinary skill in the art, once put forth as has been done in Appendix I.

In a preferred embodiment, one or more of a-aj is attached to a shaft shared by a clutch/transmission arrangement to provide, on demand, regenerative braking wherein the slowing of the shaft charges the chamber, with or without simultaneous electrical generation by the generator(s). In said preferred embodiment, a service (mechanical) brake is also provided along the shaft to act, upon actuation by a clutch or equivalent means, whenever the combined load of the generator and reversible pump/motor(s) and/or turbine(s) is insufficient to brake the vehicle, as well as when the vehicle has regeneratively been braked to a full stop. In the event that the reversible pump/motor(s) and/or turbine(s) and/or generator(s) are used to decelerate a vehicle, it is foreseen that prior art anti-lock braking algorithms will be used to selectively connect the loads of them, as well as the load of the emergency-brake, to the axle.

Where, in such applications as single-engine aircraft, Coriolis forces must be mitigated to every feasible extent, the turbo-charging stage (compressor group 1) rotates in a direction counter to that of the axial-compressor (compressor group 2) and first turbine stage (turbine group 1). As this increases the demand on any bearings between them, in any application where Coriolis is not of issue, the direction of rotation of all stages in the main TF unit should be identical. However, in any event, the most efficient arrangement, and thereby best mode, although its opposite is not un-considered by any means, involves the turbo-charging stage (even if it comprises axial compressor and axial turbine, even if it these are not concentric, even if it comprises axial compressor and centrifugal turbine or vice versa, even if all are concentric or they are separated greatly by space or not adjacent) and main unit rotatable relative to one another, since (as is the case of concentric dual- and triple-shafts of typical gas turbines) each will desire its own rotation rate to maximize efficiency. The capability of relative rotation is also necessitated by a "virtual clutching" method for engagement of the high-consumer, described below.

Also considered is the possibility that variable rotor vanes could be utilized in lieu of the self-evacuation. For instance, the vanes of the compressors could be completely closed via cascade rings or equivalent structure, such that the lead edge of one abuts the trail edge of another. This, too, would reduce internal drag on the TF to close to negligible. However, it is likely this system would be inordinately complex, and embodied likewise would detract from the robustness and compactness of the system. The speeds at which the TF will experience, and the shocks on it during the sealing and unsealing of the flow path, require as few moving parts (seen in the relative frame of the TF) as possible. As a side note, one of the advantages of the first compressor and last turbine stages' being of the centrifugal variety is to absorb the shock of said sealing off the flow path. It is doubtful axial-flow vanes, being cantilevered (perhaps even if ringed around their periphery with a runner, which is also envisioned anyway), could withstand the pressure fluctuations experienced along the first few axial inches of the compression system, without a buffer in the form of vanes of the type of a centrifugal compressor, to protect them. However, an additional buffer is provided in the preferred embodiment, in the form of the thin walls of an upstream heat exchanger and manfold, which by being of the plate-type and if thinly walled enough will bellow momentarily inwardly at the commencement of evacuation, such that the combination of the variable volume walls of the heat exchanger between the main inlet and the first compressor inlet, and the means, that by which the first two to four atmospheres of head are accrued (i.e. a centrifugal compressor and turbine nearer the seal-off point than intermediary members), being unbreakable, should ensure the compressor rotor vanes do not break, which is crucial since any alloying of the ferritic, neodymium, etc. cores will possibly diminish magnetizability, assuming blade-magnets are utilized.

As there is a DC bus, so also must the pressure accumulator be seen as a "pressure bus." It is an accumulator, and thus all accumulations thereto and expenditures therefrom, however independent in their utilization, augment or deplete, respectively, the stored pressure energy. For this reason it is not surprising that there are further uses with which it can be associated.

For instance, the shock absorbers, in the event that the machinery is a vehicle, can feed the main chamber via means known by prior US patents. Particularly in the embodiment of an automobile, a simple leading arm with a chain- or belt driven wheel receiving motive power from a motor along the arm, while up and down perturbations experience due to contours in the road cause movement against a piston and spring, heightens the hybrid aspects of the foreseen embodiments. Following the teachings of said patents, the initial deflection of the rod will charge the chamber, as will the reaction by the spring to home the rod. The chamber, being ubiquitous, is ready and willing to assume this energy for future use, and the acceleration it later provides will almost negate the deceleration caused by the contour. It is expected that this provision will more than make up for the added cost and weight associated with replacing a typical shock absorber with one of said patents, however they were disused in their own time.

Mode-Change: From Hybrid Operation to High-Consumer Operation

In a preferred embodiment no clutch is required for connecting the main shaft (MS) to the high-consumer drive. When engagement of the high-consumer is desired, the primary TF module (PTFM) is braked electrically, all its energy (the TF system inlet and outlet being closed, combustion ceased, the TF system evacuated) being transferred electrically along the electrical bus (EB) to the secondary TF module secondary turbine/flywheel module, accelerating it. The pressure accumulator PA is depleted of any contents rapidly through the pump/motor (PM1), the electrical energy obtained therefrom also being transferred to the secondary turbine/flywheel module along the DC bus. The secondary turbine/flywheel module now comprises more or less all the stored energy of the overall machine in the form of rotational kinetic (inertial) energy.

When the main shaft MS and high-consumer drive shaft have equivalent rotational velocities (not necessarily zero, as discussed later), a sleeve or collar associated with a differential (or similar torque transfer mechanism) associated with the drive shaft will be forced in a longitudinal direction (relative to the main shaft), to mate with a protrusion structure on the main shaft In some applications a slot or groove, or a plurality of either, will embrace a trunnion or like, or a plurality thereof, on the main shaft. In other applications, the main shaft will be splined on its outer diameter, and the sleeve/collar machined on its inner diameter to interfit, or vice versa. Other embodiments are foreseen. Countless arrangements are known to those of ordinary skill in the art for engaging a shaft to torque transfer means when their speeds are matched during engagement, and the simplest is of course preferred. The selection of one or the other is not of issue in the instant application. A clutch might be used, with or without the provision of matching the speeds of the shafts, as could any other means known in the art. All that is of essence in this discussion is that in a preferred embodiment the clutching is "virtual." Actual slip between the two shafts would be detrimental, but what is most detrimental is a dissipative effect on the spinning components. Most advantageously, a simple collar that does not even touch the shaft until engaging it precludes viscosity or frictional resistances to free- or fly-wheeling desired during hybrid operation. The obviation of the clutch by the virtual-clutch method is fundamental to realizing the theoretical efficiency of the proposed invention. An added benefit is that surplus energy from hybrid mode is transferred directly into the high-consumer mode.

Continuing, once the main shaft and torque-transfer leading to the drive shaft are matched in speed at their engagement point, they are positively locked for rotation together. Subsequently, the primary TF module and secondary TF module are electrically connected one to the other and allowed to approach equilibrium via the transfer of energy from the secondary turbine/flywheel module to the primary turbine/flywheel module along the electrical bus. When optimal speeds have been reached for both, combustion commences. The torque generated by the secondary turbine/flywheel module, the latter comprising no drive shaft in the preferred embodiment, continues to transfer to the primary turbine/flywheel module (and thereby to the main shaft) along the DC bus. Likewise for the pump/motor PM1, which should be operated in a manner and at a capacity to optimize the available pressure within the pressure accumulator (PA1), now being continuously charged by the TF system.

In other words, the power available from turbine group 2 is transferred, minus the load required by compressor group 1, via the magnet/coil arrangement, to the DC bus. Meanwhile, the power generated by the pump/motor PM1 (now operating as a motor) is transferred, via its corresponding motor/generator MG1 (now operating as a generator), to the DC bus. The magnet/coil arrangement on the primary turbine/flywheel module consumes all the power from the DC bus, torquing the primary turbine/flywheel module in its drive direction. The amount of power available from the DC bus is subtracted from the load requirement on the main shaft (from the drive shaft), while the load on compressor stage 2 is added thereto, and the resulting power demand is provided by controlling the combustor to impinge combustion gases upon the rotor vanes of turbine stage 1.

The following equation appertains:

$$P_{required\ of\ turbine\ group\ 1} = P_{drive\ shaft} + P_{compressor\ group\ 1} + P_{compressor\ group\ 2} - P_{turbine\ group\ 2} - P_{PM1}$$ [Equation 1]

Optimization of each module, geometrical and operational, can be determined by an iterative approach for each industrial application, for the contribution of $P_{PM1}$ will be a function of the capacity of the PA, while $P_{compressor\ group\ 1}$ and $P_{compressor\ group\ 2}$ will be a function of the desired size of the TF system, $P_{drive\ shaft}$ will be defined by output specifications, etc.

The foregoing distinguishes the high-consumer mode from the hybrid mode, and sets it aside in a view toward design. During hybrid operation, the primary turbine/flywheel module and secondary turbine/flywheel module accelerate and decelerate independently unless one falls to a speed threatening to stall future combustion attempts or fail on an impending increased required EMF to the bus, at which point a quick equilibration between the two may be initiated. All systems communicate with the bus unconcerned with one another, unless the system controller predicts a future problem (e.g. insufficient inertial energy of TF system relative to pressure within the pressure accumulator, in which case the PM1 would increase its capacity, such that PM1 can always, unless commanded otherwise, operate at the slowest possible (and therefore most efficient) rate. The load, also, should be operated solely upon input and output considerations at the load itself.

The independence of all of the units in the hybrid mode allows Equation 1 to be solved for the high-consumer mode first. The result of an iterative operation to determine the make-up of the units to satisfy the high-consumer will, it is hoped, produce a system just as efficient in hybrid operation as any other (standard HEV) would be, especially considering the ratios $P_{turbine\ group\ 2}/P_{compressor\ group\ 1}$ and $P_{turbine\ group\ 1}/P_{compressor\ group\ 2}$ will follow roughly the same curve, vs. throughput, as each other. Discrepancies between the energy available in primary turbine/flywheel module and secondary turbine/flywheel module can always be adjusted by equilibrating them, presuming they do not inherently automatically equilibrate, which they probably will. It is perceived, however, that the specifications of PM1 in hybrid mode will likely take precedence over said of high-consumer mode. In any case, solving for both simultaneously is not beyond currently marketed simulation software.

Solution of Equation 1, and considerations springing therefrom, will be the subject of further research as well as, in the event the results are surprising or entail further structural or operational advancements, the subject of continuation-in-part applications, whereupon no rights are waived and, following this string, considering the system as construed for an automobile would be monstrously different, schematically (on paper), quantifiably (sizing), and qualitatively (material selection), from that of, say, an earth-mover, it is here asserted that, barring truly innovative improvements, these results will be no more than an extrapolation of the novel concepts, as well as the novel assemblage of concepts, put forth in the present application, and therefore obvious to one of ordinary skill in the art.

In any and all areas of application, it is anticipated that all parts should be as light, yet sturdy, as possible, all magnets and conductors as effective as possible, etc., limited only by cost-benefit analysis. If it is decided to run the system on fuel-A, all pre-treatment and exhaust features associated with fuel-A will no doubt be modifications to the present invention suggested by art dealing with fuel-A in other applications. Similarly for fuel-B, etc. The shape and size of the combustors can be selected from any that can be shaped and mounted to complement the system and conform to the geometrical constraints posed by the chosen industrial application. Prior art suggesting modification for respective optimization of various seals, vanes, bearings, circuitry, ducting, shafts, airfoils, fans, motors, generators, pumps, etc. of other known systems are inherently and necessarily suggestive of modifying the seals, vanes, bearings, circuitry, ducting, shafts, air foils, fans, motors, generators, pumps, etc., of the present invention.

Mode-Change: Back to Hybrid Operation

Switching from high-consumer mode back to hybrid mode does not have to be a mirror image of the switch from hybrid mode to high-consumer mode, although it could be. In fact, the preferred manner of achieving said switch is an abrupt decoupling of the collar/sleeve from the MS. Only in special applications would there exist the possibility of recapturing the energy already passed on to the high-consumer. Thus, if the mating action that effected the coupling were reversed without matching the main shaft speed to that of the torque-transfer leading to the drive shaft, the TF system would already be well on its way to its post-run-up speed, and the drive shaft would run itself down with negligible rotational inertia excepting that of whatever load it heretofore had driven. It is foreseen that this will not always be preferred, in which case the "mirror image" might be viable or, if wasteful of time or energy, something between one and the other of the two methods described in this paragraph. As in prior discussions, the end-use will dictate the means, although the best mode is believed by the inventor to have been adequately disclosed, particularly as the "preferred" manner corresponds to the example utilized hereinbelow to discuss the manifestation of the system in exemplary industrial applications. In no way should the examples be limiting.

INDUSTRIAL APPLICABILITY

An Example

It will be obvious to one of ordinary skill in the art that a surplus energy due to stored pressure is constantly available during high-output mode. Each application will find its use for this energy, but nowhere is it more to be availed than in the application of a roadable aircraft. In fact, such an automobile is an excellent example of the potential industrial applicability of the invention.

Thus, a vehicle is disclosed, having an effective cross-section of a modified airfoil. Customs of usage require that the vehicle be inconspicuous, in appearance akin to known automobiles. However, it is proposed, that the power-plant and associated system, housed and modified appropriately, enable a wheeled vehicle similar in appearance to a typical streetcar, to operate as an airplane, capable of takeoff from and landing on road, driveway, heliopad, roof, lawn, and still water. These attributes are derivative fruits of the innate arrangement of the system heretofore described. The inventor has extrapolated from said fruits to purport at least a working, if not perfected, embodiment for realization of such a vessel.

The embodiment's common name is a roadable aircraft. Like in other prior art pursuits, the effective cross-section of the majority of the width is made to encompass all the working modules of the system. Said effective cross-section, that of a modified airfoil, can be destroyed by flaps, louvers, fins, etc., such that, until lift is desired it is nonexistent or negligible. Further desired are the parts not associated with the effective cross-section, those that render the appearance of the vehicle to be not overtly dissimilar to a standard car, and those which convene daily use by a driver. However, the advantages of the concept herein disclosed cannot be overlooked. With a glance at the provided figures, although they should not be seen as limiting, it is clear that the airfoil can be realized, following the methods hereafter detailed, such that once it is provided, given a certain thrust lift is inherent. Thrust is provided in the preferred embodiment, in the form of an impeller/fan/propeller/etc., rotated within its housing, or with no housing, by the drive shaft, via or not via intervening gears, clutches, etc. from the TF main shaft. Two of the three underlying predicates of sustained flight have been here met, for it follows (from Bernoulli's principle] that given sufficient speed, the airfoil-cross-section will provide adequate lift, and that given the weight and throughput of the disclosed power plant, adequate thrust has been provided to attain said speed. It is a foregone conclusion, since the advent of, say for instance, nozzle-directed air-to-air missiles, that an accelerometer combined with a respectable computer processor, and in the event these are insufficient some marginal attempts at ailerons, hereafter discussed, can use "offset nozzles" to reduce all pitch/roll/yaw stabilization concerns to nil, producing a steady craft if there were a way to embed pressurized cartridges with nozzles on the four corners of the craft—so, serendipitously for us, the entire housing PA1 is a pressure cartridge. What is hereinafter proposed is that nozzles, each in communication with the chamber across a controlled valve, are located at the very front of the vehicle, on each front corner one pointed up one pointed down, and one pointed laterally outward, totaling six, so as to in reaction to an accelerometer and "desired course" models, pre-programmed yet modifiable, enable a computer processor to stabilize the vehicle. It is conceded that this procedure will be involved, but not beyond ordinary skill in the art, for if a missile can be made to hit another, nozzles can surely be set to maintain the sustained flight of an airfoil of considerable MOI about all axes, given thrust and lift requirements have been met.

The following provisions are envisioned:

a) a vertical take-off "VTO" nozzle placed on the nether extent of the vehicle, to provide downward exhaust impingement of the pre-expanded chamber air on a vertically inferior portion of road or air, selectively augmenting lift;

b) a vertical take-off "VTO" panel set in the rear of the vehicle, to complete or destroy airfoil cross-section in a longitudinal sense, augmenting lift in the airfoil sense while hiding, closing, and protecting, in the airfoil-destroying sense, the impeller. The VTO panel comprises minor panels, controllably actuated along a spectrum of opennesses, for deflection of thrust from the impeller downwardly.

The geometries of the power plant, electrical apparatus, motors, and vehicle shown in the figures, should not be seen as limiting, but as the best mode envisioned at the moment by the inventor in its simplest embodiment. No doubt considerable computer modeling will alter the final shape of each item depicted in the drawings, as will subsequent improvements, made either by the inventor or by the industry. The essence of the invention is in the novel combination of heretofore uncombined technologies and parts, as set forth in the claims appended hereto.

In the same vein, it is proposed here with profound emphasis that the roadable aircraft is a secondary consideration of the instant application, the claimed subject matter dealing primarily with the hybrid motor and the industrial applicability of said, and the inventor reserves the right to follow with, a propos of discernible industry demand, continuation, divisional, and continuation-in-part applications concerning the inner workings of the system of the power plant or its workability, the mechanical and/or electrical interrelationships of the terrestrial applicability of the machinery, or the aerodynamics of the vehicle as so far conceived, as befits his interest, none of the matter not within the scope of the claims hindering or compounding the U.S.C. sections 101, 112, 102, and 103 requisites beyond any reasonable objection by the PTO, insofar as the gist of the claimed subject matter has here, or in subsequent paragraphs, been delineated ad nauseum. Whether the TF in effect pertains to one high-user or another and to one low-user or another (high and low corresponding to the two stages of the invention, the first low-power, hybrid output, and the second high-power, non-hybrid or quasi-hybrid output, respectively), the scope of the instant application should not be seen as limiting save insofar as the appended claims delegate.

Since flywheels require high peripheral weight, since generators require magnets and coils, and since turbine engines require high peripheral speeds, the invention kills all three birds with one stone. Another system using weighted element(s) for the flywheel, separate magnets for the generator, and some non-negligible mass for the rotor blades, is necessarily more massive and voluminous than the instant invention.

The field of endeavor of the instant application is vast, and the examples used to depict advantageous manifestations of the inventive concept should by no means be limiting. For instance, the low-power/high-power combinability applies to, mentioning only a few: earth-movers and other dump trucks, tow trucks, tugboats, tankers, fifth-wheel-hitch-enabled cabs (tractor-trailers), etc., wherein the electrical energy and shaft torque would be directed to a single consumer or set of consumers, through gearing or appropriate circuitry delivered along a single shaft or multiple shafts. For instance, the drive shaft of an idyllic tugboat or tow vehicle would be favorably received by the industry in conjuring 7-10X horsepower from an engine that can run at maximum efficiency at 1-2X, X being a coefficient. Equivalently for unladen earth-movers and tractor trailers or for tow vehicles for earth-movers or tractor trailers. Also propitious seems some form of "universal tool", wherein the vehicle would be a portable PTO (power take-off) shaft connectable to a fleet of unpowered implements. Not among the least likeliest embodiments is the arrangement of the power-plant and chamber proffered as a possible solution to fixed-wing VTO pursuits. It is not foreseen that the invention will be immediately advantageous in typical applications such as terrestrial passenger vehicles, trains, etc. The advantages will, possibly, only make up for the increased material costs by providing, on demand, a non-hybrid mode of high power output capabilities.

One end of the main shaft of the TF is selectively engaged to a high consumer, such as the propeller/fan of an aircraft, a work implement, hydraulic pump, etc. In fact, with proper arrangement and in conjunction with proper body geometries, described in this document, the hybrid system can be utilized in a roadable aircraft. However, it is also foreseen that, with time and given a great deal of perfection, not to mention mass-production, the unit could be viewed as applicable to environs not requiring the high power mode, such as in metro-buses.

BRIEF DESCRIPTION OF THE DRAWINGS

The foregoing discussion will be understood more readily from the following detailed description of the invention, when taken in conjunction with the accompanying drawings.

FIG. 6 is a cross-section taken along line 6-6 of FIG. 9, showing the effective cross-section of the majority of the vehicle of the first embodiment of the invention.

FIG. 7 is a cross-section taken along line 7-7 of FIG. 9, showing the cross-section at the center of the vehicle of the first embodiment of the invention.

FIG. 8 is a cross-section taken along line 8-8 of FIG. 9, showing the cross-section at the side of the vehicle of the first embodiment of the invention.

FIG. 11 is a table providing the chronology of steps utilized in hybrid operation of the first embodiment.

FIG. 12 is a table providing the chronology of steps utilized in transitioning to high-consumer mode from hybrid mode, and also for transitioning back to hybrid mode, or a parked configuration, from the high-consumer mode.

FIG. 13 is a continuation of FIG. 12.

FIG. 20 is a view of the casing of the turbine flywheel and the gas transmission passage of the second embodiment.

FIG. 21 is a top cross-section of the combustor of the turbine flywheel.

FIG. 22 is a bottom view of the turbine flywheel showing the spacing of the combustors around the turbine flywheel.

FIG. 23 is a schematic of the gas flow for a first mode of operation of the second embodiment.

FIG. 24 is a schematic of the gas flow for a second mode of operation of the second embodiment.

FIG. 25 is a schematic of the gas flow for a third mode of operation of the second embodiment.

DETAILED DESCRIPTION OF THE PREFERRED EMBODIMENTS

Figure 1:
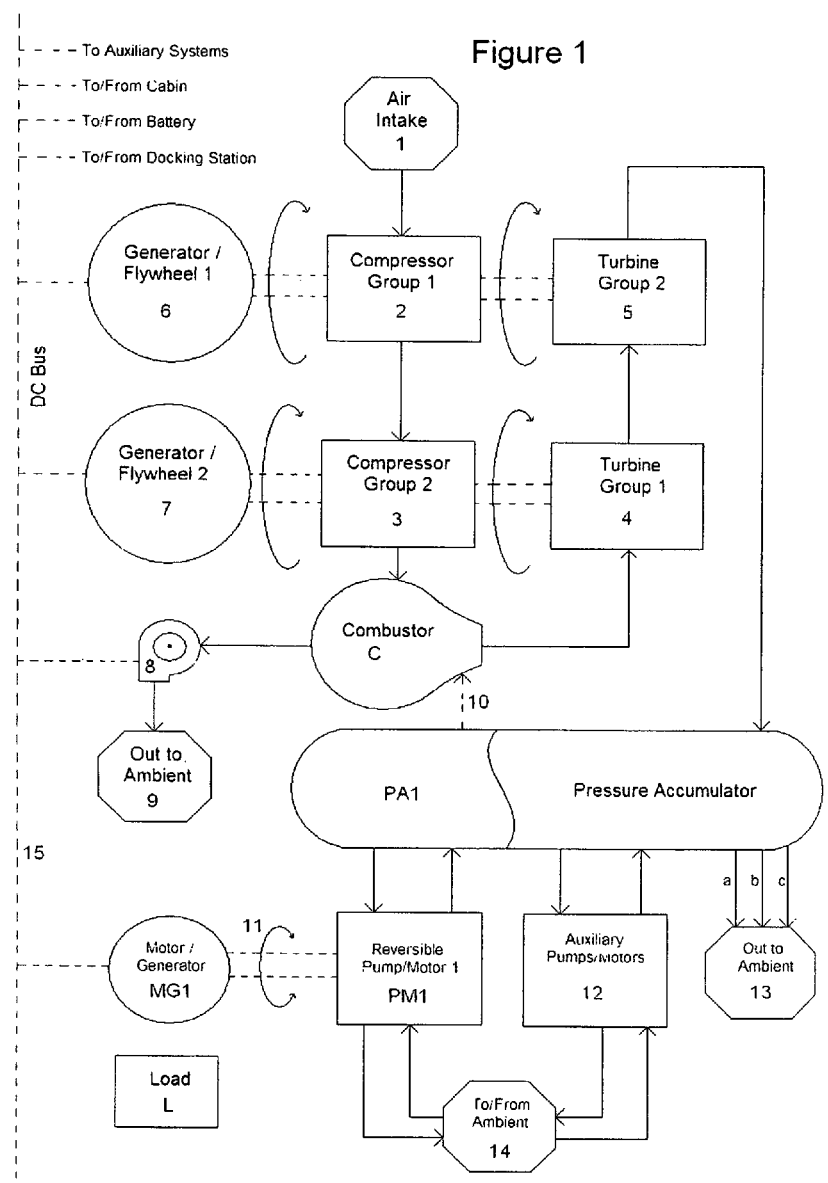
FIG. 1 is a flow diagram for the flow of gases through the various modules used to implement the present invention.
Figure 2:
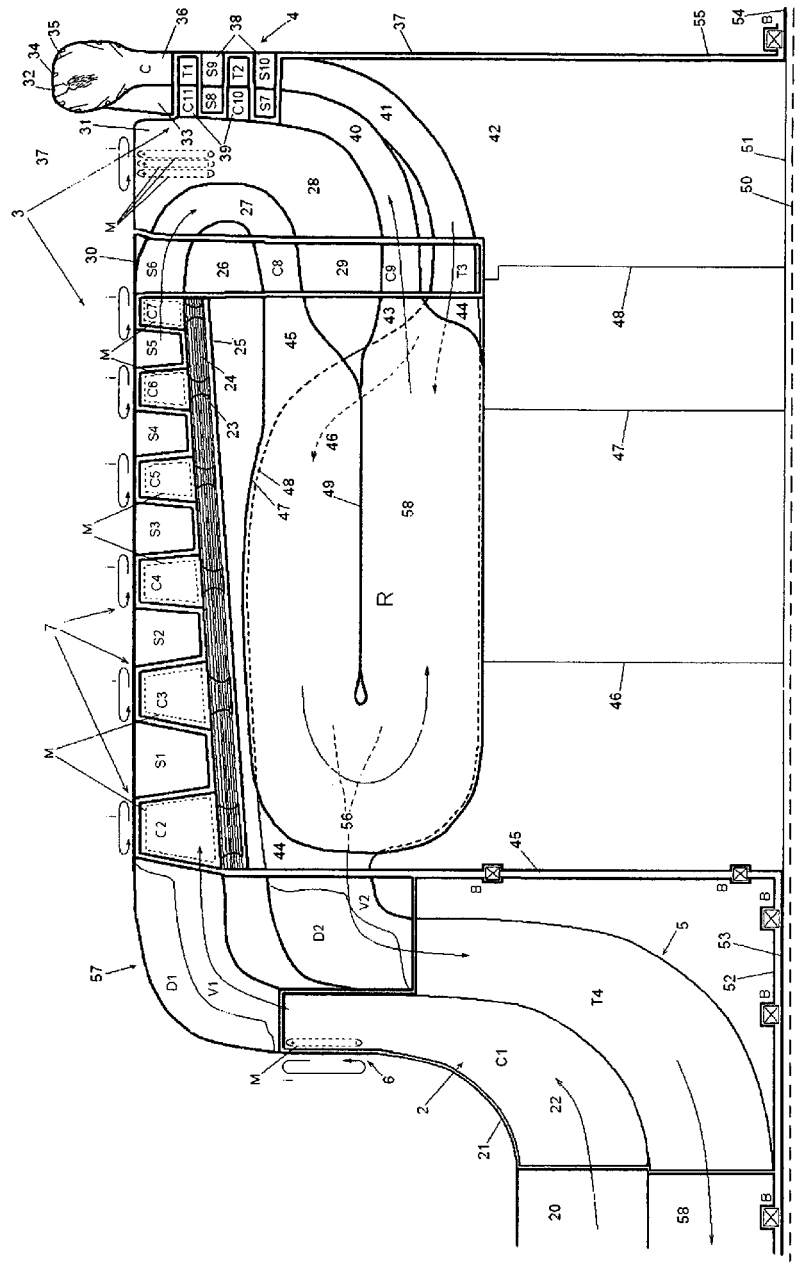
FIG. 2 is a semi-cross-section (cross section of one sector) of the turbine flywheel TF showing the compressor, turbine, stator, generator, and combustion modules.

The following description of FIG. 1 is meant to be understood in conjunction with FIG. 2. The flow chart of FIG. 1 shows the flow of gases through the entire system. Air enters the system from air intake 1 and passes, via a shutter valve (described later) after traversing a heat exchanger (described later) to the first compressor group 2. The air is compressed by first compressor group 2, which is driven by the second turbine group 5 and is integral with the first generator/flywheel 6. The air passes from the first compressor group 2 to the second compressor group 3, which is driven by the first turbine group 1 and is integral with the second generator/flywheel 7. In the embodiments of the present application, 2, 5, and 6 are concentrically arranged about a longitudinal axis 50, and 4, 3, and 7 are also concentrically arranged about said longitudinal axis 50. After the second compressor group 3, the compressed air enters a combustor C, which for this discussion can be seen as a typical combustor can but which will later in the application be discussed further a propos of its geometry when applied to the TF. The exhaust from the combustor passes to the first turbine group 4 and then, after traversing a recuperator R, to the second turbine group 5. The exhaust passing from the second turbine group enters, via a shutter valve (described later), a pressure accumulator PA1.

The pressure accumulator can be large and in the embodiments of the present application it surrounds the greater part of the TF casing and is confined by the outer walls of a vehicle. The pressure accumulator PA1 communicates with the ambient air outside of the vehicle via a reversible pump/motor PM1 and possibly other pump/motors 12, which when driven by air expanding therethrough are motors, usually driving a motor/generator (in the case of PM1, it drives MG1), and when taking air into the pressure accumulator PA1 to charge it to higher pressures, are driven by the motor/generator and act as pumps. Further escape valves allow gases within the pressure accumulator to pass directly to the environment, as shown by passageways a, b, and c leading from the pressure accumulator PA1 to outside 13. Shaft 11 depicts the rotational interlock between the reversible pump/motor PM1 and the motor/generator. Motor/generator MG1 is electrically connected to a DC bus 15, which communicates with first and second generator/flywheels 6 and 7. The DC bus is further connected to the load L, which could be in-wheel electric motors with regenerative breaking reversing the electrical flow back to the bus from the load. The DC bus is also connected to auxiliary systems, the cabin, and possibly (in embodiments not of interest in the present application) a battery and/or docking station. An evacuation pump 8 is connected to the combustor C, preferably near the air inlets or near the burner nozzle, possibly in conjunction with the latter, and when activated causes a negative pressure which removes any air in the combustor. This will be described later.

The air from the evacuation pump also passes out to ambient 9. Reference numeral 10 indicates a further provision, not dealt with in the present application, whereby instead of expanding the gases through PM1, or in addition thereto, the gases in the accumulator are passed through the first and second turbine groups 4, 5, again, without combustion, to ambient. This provision is not at this time seen as fruitful, but has been included for the sake of full disclosure.

Turning now fully to FIG. 2, although reference may be made to FIG. 1 throughout the disclosure, the air entering the inlet 20 is shown as airstream 22. After the inlet 20 it enters a centrifugal compressor C1, which in this embodiment makes up the entirety of the first compressor group 2. The air passes outwardly along compressor C1, being thereby pressurized and flung into volute V1, where it may be guided by diffuser D1 and/or stator vanes, swirl vanes, anti-swirl vanes, etc. into the first stage (C2 and S1) of the second compressor group 7. The compressor C1 is attached to, and locked for rotation with the second turbine group 5, namely the fourth turbine stage T4 which is a centrifugal turbine. The compressor itself is, and in this case the vanes between the air passages are, embedded with magnetic elements M near the casing 21 and preferably as far to the radially outer extreme of the compressor as possible. The magnetic elements interact with conductive coils i in or on the casing to create or absorb electrical current. The magnetic elements M plus the conductive coils i make up the first flywheel/generator 6, in that the mass of the magnets plus the combined masses of the compressor and turbine carry a rotational inertia about 50 which resists the voltage acting against its continued rotation during electrical current creation. Further, when an EMF is applied across i, the magnetic elements M are accelerated in a direction depending upon the direction of the current.

As stated, the air passes from the first volute V1 and into the first compressor stage C2 and S1. C2-C7 are axial-compressor rotor vanes and each has a root 23 that sits in and is anchored by, in a preferred embodiment, layers of fiber-reinforced plastic or carbon-fiber-epoxy sheets that have been spun around the rotor wall 25, with the roots temporarily attached, and cured, permanently and durably fastening the compressor vanes C2-C7 to the rotor wall. The strength of this bond is important as the system will rotate at extremely high velocities. The stator vanes S1-S5 are traditional stator vanes and are interspersed with the compressor vanes C2-C7. Each compressor vane C2-C7 is embedded with a magnetic element M which interacts with conductive coils i in the same way as described in the preceding paragraph. The magnetic elements M, the fiber/resin layers 24, and the bodies of the compressor vanes C2-C7 make up the greater part of the mass of the rotor of the second compressor group, and thus form a flywheel as do corresponding elements of the first compressor group 2, and by much of those items being magnetic, also form a generator. It is here noted that 30 indicates an annular disk with solid, structural elements 26 and 29, and passageways S6, C8, C9, and T3. The gases exiting the last turbine stage pass through stator S6 and then to a passage, also vaned, to turn and pass through a stator C8, which is here labeled as a compressor stage C8 because the air, being entrained within the body of rotor 28, 25, 42, 45 etc. at this point, will see the stator C8 as a compressive stage C8, and will be further compressed such that when it passes to rotating passage 45, it seems stationary in the relative frame of the rotor as if it had just passed through a single compressor stage. Now arrived at passage 45, said air passes leftward, as seen in FIG. 2, and 45 becomes a manifold whereby an annular passageway 45 is divided into dozens of sector-shaped passages 47 interspersed with sector-shaped passages 48 which carry exhaust that is downstream of the combustor. This is the recuperator R, whereby the thin walls separating 47 and 48 (the dotted lines for 48 indicate that the cross-section used for FIG. 2 is in the plane of the compressor side sectors 47, which are shown with solid lines) pass heat from the combustor-downstream sectors 48 to the air in the air currently under discussion, raising its temperature and thus, performing work on it and taking work from the turbine side.

The air enters another manifold where it merges back into an annular passageway and enters another stator C9, which for the same reasons given for C8 is treated as a compressor stage. The edges of the entry and exit vanes of 45 and 53 should be bent to an angle to complement such a relationship with the stator vanes C8 and C9, as should the edges of passageways 40, 41, and 44. The air now enters a passageway 40 where it is again flung outwardly (this could be seen as a compressive stage but the air therein is only regaining the energy it lost by being pushed toward the axis 50 in 27 and R to begin with, so this will not be discussed). The air enters a stator S7 where it is deflected to a proper exit angle to act on C10, which with C11 make up the final two compressor stages 39, separated by another stator S8. By the time the air enters the combustor C through passage 33, it will have been acted upon by approximately 11 compressor stages, one of which is a large centrifugal compressor, such that with the recuperator R the enthalpic rise should be the equivalent of at least a 14-stage axial compressor. It is mentioned in passing that the recuperator and change-of-direction passageways can be done without and the air could simply pass from S6 to 33. The more complicated embodiment has been included for patent purposes for it inherently comprises all the elements of the simpler ones. 31 depicts the outer edge of rotor segment 42. The rotor has been divided up into segments 2, 48, 47, and 46 to show that during manufacture it can be stacked and that it would not be required to perform the impossible, which would be to have the rotor formed whole. In the event that 30, the turning passages, and the recuperator R were removed from the concept, these considerations would be less profound. It is also envisioned that annular segment 30 could extend all the way to axis 50 and 42 would be a third compressor/turbine/generator/flywheel rotating independently of 2/5/6 and 3/4/7, but in this case it is uncertain at this time what turbine would drive compressor stages C2-C7.

Continuing with the discussion of the rotor depicted by reference numerals 42, 28, and 31, more magnetic elements are spaced around the periphery near 31 and interact with conductive coils i, as previously described. 28 and 42 are not actually solid, but insofar as the air is concerned, they are. The air enters the combustor at 33 where it passes into the combustion chamber through nozzles 34 and it is ignited by a fuel mix coming from fuel burner nozzle 32. 35 are flame propagation nozzles that contribute to forming the flame and preventing the flame from passing upstream. This is well known in the art. The exhaust of the combustor passes through 36 to impinge on first turbine stage T1 which in this embodiment is of a piece with C11, as is S9 with S8, T2 with C10, and S10 with S7. This arrangement is hoped to save space and allow the radial compressor stages and turbine stages to coexist and be advantageously located radially inwardly of the combustor and at the end of the machine. Wall 37, with 21, completes the outer casing of the device.

The stators 38 of the first two turbine stages could easily be made to swivel via a simple ring gear to be variable stator vanes, allowing it to change the flow characteristics through the first turbine group 4 to adjust for different altitudes and rates of combustion. The air passes from first turbine group 4 to another passageway 41 which delivers it to another stator T3 which for the same reasons as C8 and C9, is being treated as a turbine stage. Although counterintuitive and hard to understand, the laws of gas turbine engine theory can be used to prove that energy is recovered from the exhaust stream here (as it is provided by C8 and C9), and although it is not the intention of the present application to define this, the inventor sees this as far simpler than describing how it is actually 27, 45, 40, 41, etc. that are absorbing and performing the work. The virtual enthalpic ratio across T3 can be seen as approximately 1.4:1, and the same goes for C8 and C9. From T3 the exhaust enters another manifold 44 which splices with manifold 43 to create the sectored recuperator R described above. Element 49 exists in the compression side 58 of sectors 47 and is used to guide the flow from 45 to 43, bringing it out in an opposite axial direction from how it entered. However, no such element is used in the turbine side sectors 47 because the air from T3 moves more or less axially to arrive at another manifold, also indicated as 44, to be fed into the second volute, V2. It is noted at this time that V1 and V2, as well as any space or substance between them, are part of an annular body 57 that is fixed to the casing 21 and extends radially inwardly therefrom. Like V1, volute V2 can also have a diffuser D2 or some type of swirling or anti-swirling vanes, and is integrally vaned to evince some type of indescribable, despite conceived efforts, stator vane which serves as a volute for the fourth and final turbine stage, T4, which is the sole representative, in the preferred embodiment, of the second turbine group 5. T4 and C1 are locked for rotation with each other and sit on a spindle 52, which nests around shaft 53 which is integral with the rotor 42, 46, etc. at 51. Spindle is separated from the main rotor 42, 53, etc. by bearings B to define a space 45. It is unknown at this time what type of bearings would be most cost-effective, but of course the idyllic embodiment would be levitational-bearings (alternating magnetic fields facing each other creating constant repulsion). 54 defines the output shaft and is integral, in the preferred embodiment, with 42, 53, etc. The overall machine is quite small, so it is not unforeseen that 54 could be cast or forged with 42. The air exiting T4 passes to outlet.

In operation, 5 drives 2 and 6, and 4 drives 7 and 3. Any force on 5 will be communicated to 2 and 6, any force on 2 will be communicated to 5 and 6, etc. Any force on 4 will be communicated to 7 and 3, etc. This is why 5, 2, and 6 are shown in FIG. 1 to be on a virtual shaft, although there is no shaft, they are integral. The same goes for 4, 7, and 3. This is why the device is called an integral gas turbine, flywheel, and generator.

Figure 3:
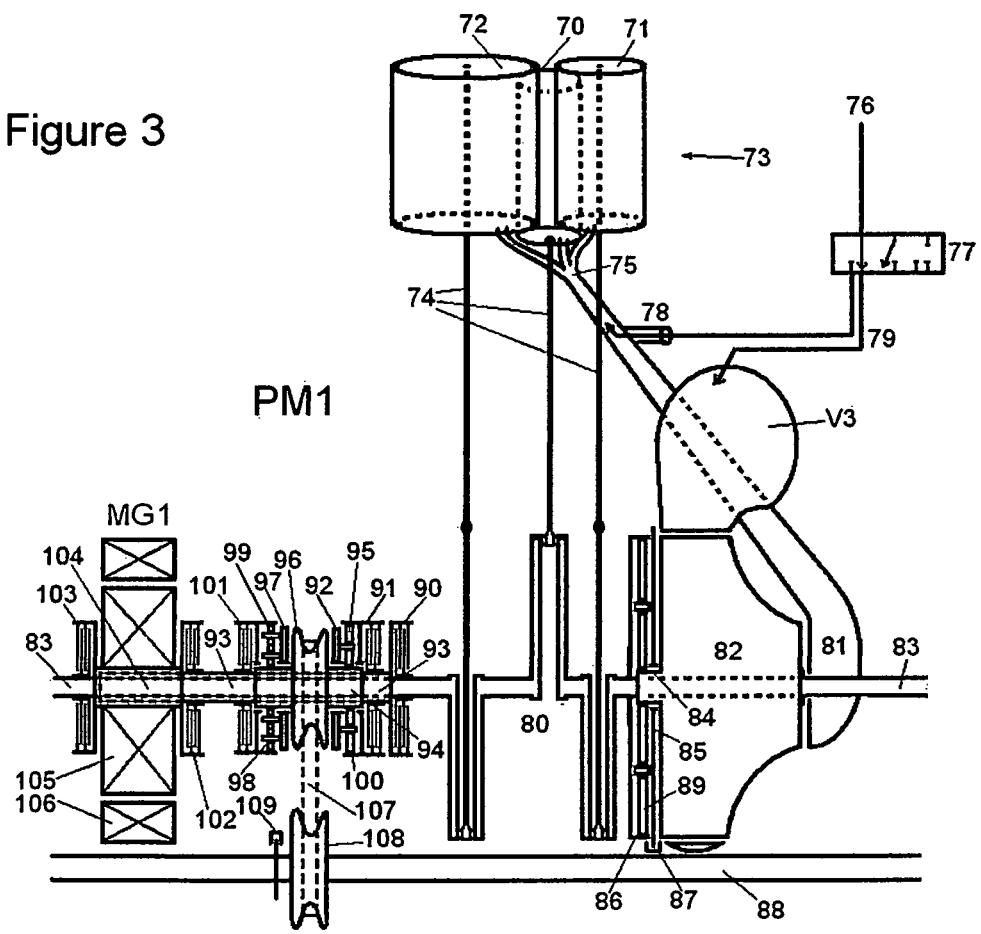
FIG. 3 illustrates an embodiment of the reversible pump-motor PM1, the motor-generator MG, and the transmission between these and the drive axle of a vehicle.
Figures 4, 5:
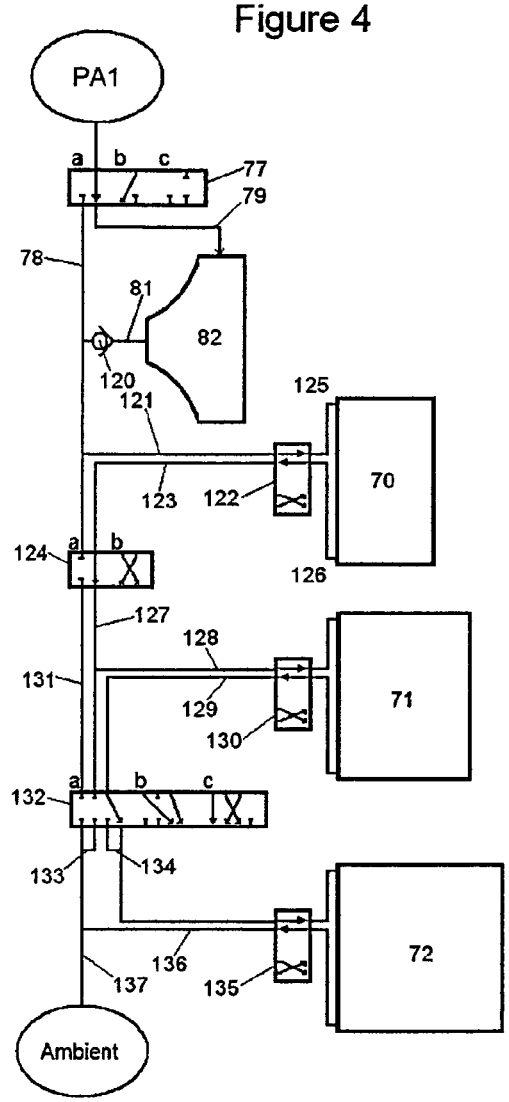
FIG. 4 is a gas flow strategy for selectively changing the mode of expansion through the reversible pump motor.
FIG. 5 is a table explaining the six currently foreseen combinations of valve settings for FIG. 4.

It is noted that to ease understanding of the invention, one would be well advised to skip the discussions of FIGS. 3-5 and return to them only when a fuller understanding of the overarching concepts has been established. They are not directly claimed in the present application. However, for disclosure and best-mode purposes, as well as to provide basis for being claimed in later applications, it is necessary to describe them now.

FIG. 3 shows pump/motor PM1 and motor/generator MG1. Air enters this system from PA1 via 76 and immediately encounters a three-way, three-position valve that serves to close PM1, send gases to a turbine 82 via path 79, or bypass the turbine and, along path 78, send gases directly to the piston cylinders 70-72 that make up the vital portion 73 of PM1. The air entering the turbine enters through a standard volute V3 and exits at 81. After 81 the air enters a distributor 75 that is actually represented by FIG. 4 and is not simply an entrance manifold. 70-72 become progressively larger and the air is successively expanded, after (or not) being expanded in the turbine, through these three stages, and harnessed for work thereby. The piston rods 74 turn a crankshaft 83 at 80, on which is also disposed the turbine 82 and the mechanism by which the turbine powers the crankshaft. Extending from turbine 82 is a stub which is notched all the way around to make a sun gear 84. Around the sun gear are orbital or planetary gears 89 that engage the teeth of the sun gear and rotate on planet carrier 85 which can be braked by 87. The output of the planetary gears is passed along to the ring gear 86 which is fixed to the crankshaft 83. This type of gear reduction is well known in the art and needs not be defined here, save to state that braking and de-braking the carrier 85 leads to two different step-down ratios, such that the turbine should be able to drive the shaft over two distinct or overlapping ranges of pressurization upstream of the turbine. At these (relatively higher) PA1 pressures, the exhaust from turbine 82 passes to 75. At lower PA1 pressures the turbine becomes useless and 77 is switched to path 78. Regardless of whether the turbine has bee cut in or out at 77, the exhaust now expands in 70, 71, and 71. At relatively higher pressures it may be advantageous to expand the exhaust through 70-72 in succession, and that is why 72 is shown as larger than 71, 71 is shown larger than 70, etc. However, after drawing FIGS. 3 and 4 the inventor, upon weighing both alternatives, believes that the best embodiment for PM1 would be to pass the exhaust through all of the piston-cylinders in parallel and forego the turbine during hybrid operation (described later). Exhaust would simply be valved in on the pressure side of the cylinder at a pressure slightly above the ambient pressure (the outlets of the piston-cylinder arrangement communicate with ambient air). The control of this valving will be of vital importance, for if done properly the pressure drop across the cylinder can be kept as low as possible, and the movement of the piston rods as slow as possible, maximizing the energy rendered.

The driven parts 74 and 86 drive the crankshaft which, on the left end, is surrounded by a sleeve 93 which is further surrounded, at two points, by outer sleeves 94 and 104. Outer sleeve 104 can be clutched to crankshaft 83 by clutch 103, locking the rotor 105 of the motor/generator MG1 for rotation with the crankshaft. Clutch 102 locks 105 for rotation with sleeve 93, which is clutched, via a direction-reversing arrangement, to an output pulley 96, which with belt 107 and axle pulley 108, comprise a continuously variable transmission (CVT) of known type. The outer periphery of sleeve 94 is splined and carries, on each side of output pulley 96, sun gears that cooperate with planetary systems 92 and 97, one of which has a single ring of planet gears and the other has a double ring of planet gears, such that the ring gears 99 and 91 will be driven in opposite directions from each other, inverting the drive relationship between 107 and 83 depending on whether clutch 91 locks 100 for rotation to sleeve 93 or clutch 101 locks 100 for rotation with sleeve 93. Clutch 90 locks the sleeve 93 for rotation with crankshaft 83. It will be apparent to one skilled in the art that the piston rods 74 can drive MG1 without connecting to the CVT, the CVT can drive MG1 (or vice versa) without connecting to the piston rods or the turbine 82, and the piston rods and/or turbine can drive the CVT (or vice versa) without connecting to MG1. 109 is a service brake and will be used when loading the axle 88 via PM1 and MG1 is insufficient for achieving the desired braking force. 106 is the stator coil of the motor/generator MG1 and its polarity will be oscillated and inverted to energize or be energized by the rotor 104.

FIGS. 4 and 5 describe how the air from PA1 can be sent to the expansion modules 70, 71, 72, and 82 in different modes of operation. Theory will be foregone at this point and the parts described. The device works as shown in FIG. 5 and only a description of the parts will be made here. 77 is the same three-way valve from FIG. 3, cutting in or out the turbine 82. A check valve 120 is provided in outlet 81 of turbine 82 to prevent backflow. Before valve 124, line 78 splits off on line 121 to enter the inlet 125 of piston cylinder 70. Switch 122 inverts the relationship between inlet 125 and outlet 126, such that first one side (top) of 70 is the pressure side, and then when the piston has traversed the cylinder, that side (top) becomes the relief side. The return line 123 enters valve 124 in parallel with line 78. Valve 124 switches the feed from lines 78 and 123 to lines 127 and 131 as shown by the arrows associated with a and b. 128, 129, and 130 are exactly the same as 121, 123, and 122, respectively. Valve 132 can only be described by directing a reader to the arrows of a, b, and c and allowing them to be imagined in each of their three settings as relates to lines 133 and 134. These types of valves are known in the art and would unduly encumber the disclosure if an attempt were to be made to describe them. In short, the air arriving from 137 can arrive there after being passed through the cylinders and turbine according to the modes 140-145 in FIG. 5, each being a combination of valve settings which cause series or parallel or hybrid series-parallel flow through the piston-cylinders, depending on the pressure within PA1 and the power output requirements of PM1, as well as external concerns.

Figure 9:
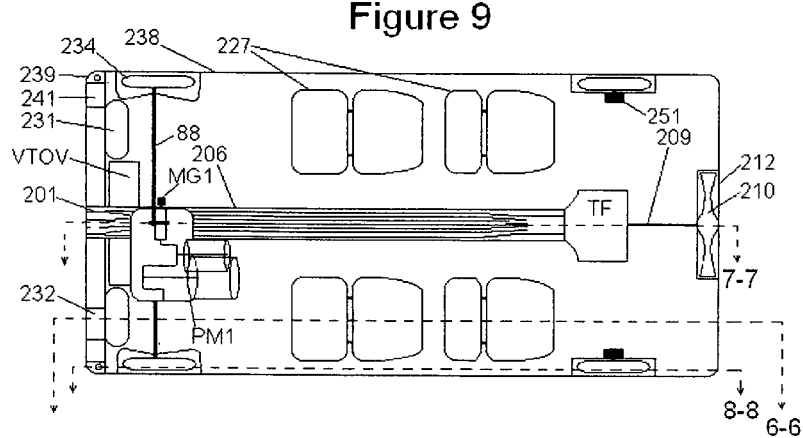
FIG. 9 is a top cross-sectional view of the vehicle of the first embodiment of the invention, providing basis for FIGS. 6-8.

FIGS. 6-8 correspond to FIG. 9, which shows a vehicle according to the first embodiment of the invention as if the top were removed revealing the internals. TF is the turbine/flywheel of FIG. 2, and MG1 and PM1 are the same as those from FIGS. 1 and 3. Turning first to FIG. 9, the body of the vehicle is shown as 238. Seats 227 are provided for passengers in the event that this is a passenger vehicle. An electric motor 251 is provided, now taking the place of the load L, for each of the rear wheels and communicates with the electrical bus of FIG. 1. A cowl 212 encases a fan or propeller 210. Wheels 234 are steering wheels and are connected to the drive axle 88 and, thereby, to PM1 and MG1. Pitch/roll/yaw stabilization nozzle housings 239 are on the front corners of the vehicle, and vertically sweeping radar modules 241 are provided to sense the orientation of obstacles and terrain relative to both front corners of the vehicle. 232 is a camera to provide a dash display of the field of view that the driver cannot see, more or less that below and before the vehicle. 201 is an intake manifold for the turbine/flywheel TF, and 206 is a plate heat exchanger for the TF's exhaust to thermally communicate with its intake. 209 is the drive shaft for the fan and it can directly couple to the output shaft 54 of the TF. Lines 6-6, 7-7, and 8-8 relate to the cross-sectional cutaway FIGS. 6-8, respectively, and show approximately where FIGS. 6-8 pertain across the lateral extent of the vehicle.

Turning to FIG. 6, the dotted line 229 surrounding the vehicle is included to show that the major expanse of the vehicle's body 230 conforms to the shape, as nearly as possible, of an ideal airfoil. The flap 225 folds up, to spoil this shape and cancel lift, and down; or complete this shape such that, given sufficient thrust and pitch/yaw/roll stabilization, the vehicle will automatically become airborne. PA1 commandeers every cubic inch of the vehicle not needed for personal use. The larger it is, the more gas it can store, the more efficient the system becomes. 224 is the back wall of the vehicle and holds 226, which is the hinge upon which flap 225 pivots. 231 is a fuel tank. 233 is the dash and control module of the vehicle, and 228 is hoped to show the creation of leg-room for occupants of the vehicle. All ergonomic considerations cannot be dealt with in this application, and therefore have been mostly omitted.

FIG. 8 shows what the vehicle of the first embodiment might look like from the side. It does not look like an airfoil because of panel 237, and it is assumed that this will be pleasing to a customer, that his/her car not look outlandish. 225 is shown in its upright configuration, and a spoiler fin 235 shows other aspects that might be added for aesthetic purposes, as well as to offer a moment to expound on other features that might be desirable. Such as, although no one wants wings on their car, it might prove optimal to locate other airfoil-shaped objects around the vehicle to supplement lift and stability. Also, from the spoiler shown a tail-fin might be made to pop up, providing a good location to implement a rudder. It is doubtful the vehicle would be stable without a rudder. Dashed line 236 indicates the location of back wall 224 on the other side of panel 237. 238 is meant to be the main body of the cabin, comprising doors, roof, etc. Pitch/yaw/roll stabilization nozzle housings each have three nozzles 140, selectively actuated, allowing bursts of gas to escape PA1 upwardly, downwardly, and laterally outwardly, from each corner of the vehicle. It is believed that with no great amount of computing power, a 6 D.O.F. accelerometer/gyrometer and the proper algorithm, unwarranted pitching, yawing, and rolling can be offset and smooth air travel experienced. In all of FIGS. 6-8, 221 represents the inhabitable space of the interior of the vehicle.

FIG. 7 shows the preferred embodiment for implementing the system of FIG. 1. Air is taken in at the inlet 201 and passes through plate heat exchanger 206 where it experiences thermal exchange with the exhaust from the TF, which is forced down into PA1 by 202 and is shown as arrow 203 coming out of the heat exchanger into the pressure accumulator. From 206 the air enters the TF via a manifold 219, which takes the concentrically arranged inlet and outlet streams from the TF and places them in alternating passages, making heat exchange more efficient and simplifying the device 20, which is a seal, having two positions, and by sliding it up and down the controller can close simultaneously the inlet and outlet of the TF, or simultaneously open them. 70 and 71 are shown to represent the piston-cylinder array 73 of PM1 and 108 is the drive pulley on the drive axle, 107 being the belt of the CVT. 204 is a thrust reverser for the intake air, and can be opened while 201 is closed to take in air vertically instead of horizontally.

A vertical take-of valve VTOV is provided to send air, through bore 205, through outlets A, B, and C. By controlling it, gases from PA1 escape therefrom at high velocities, modifying the thrust vector of the vehicle overall. Passage A sends the gases rearwardly where they escape at 216 and supplement thrust of the fan. 217 is a panel with outlets which can be opened such that air 218 is directed downward, in the event this device is to be used as a hovercraft or hydrofoil. Although this is foreseen, it is not a subject of the present application. Position B directs gases directly downwardly. Position C directs gases downwardly and forwardly, also acting as a thrust reverser to be used with 204 in certain applications.

The right-hand side of FIG. 7 depicts a vertical take-off module comprising manipulable flaps 213, flap panel 215 having tracks for the flaps 213, and the fan casing 212 and hub 211. Airstreams are shown to portray how each of the panels in its different position affects the air through and out of the turbine. Vertical panels 214 pop up from the flap panel 215 when it is fully extended and before the flaps 213 are moved up. These panels 214 serve as outlet guide vanes for the turbine and disallow stream migration and surge when the flaps are in different positions from each other. A rotational shaft-to-shaft coupling 208 allows connection of the TF to the drive shaft 209 to drive the fan. The output shaft 54 of the TF is as short as possible. It possesses trunnions or splines that mate with corresponding female members on the inside of a sleeve or collar that can be slid, in the direction of the arrow shown by 208, over the output shaft, such that the trunnions or splines drive the collar or sleeve, which in turn drives, through reduction gearing similar to that shown in FIG. 3, the drive shaft and thence the fan.

Figure 10:
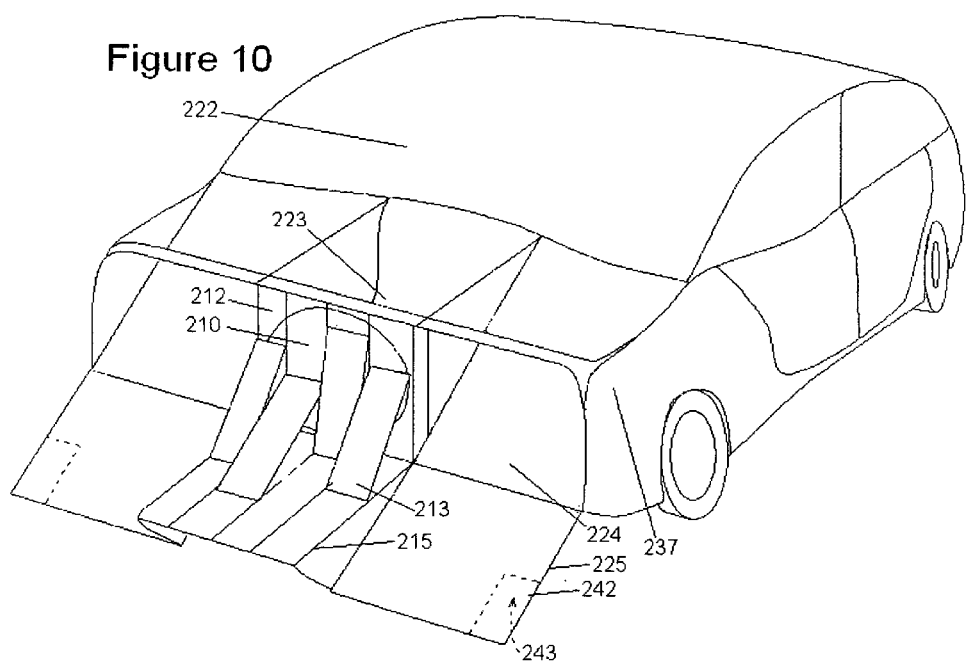
FIG. 10 is a rear elevational view of the vehicle of the first embodiment of the invention.

FIG. 10 shows a rear view of the components of FIGS. 6-9 and will not be explained again except in those reference numerals that were not explained above. Namely, that the flaps 213 can assume any imaginable combination of angles, such as a controller might deem appropriate for vector nozzling the fan thrust. Also, that 223 dips down farther than 224 by the inlet of the fan, but no more than necessary. Also, that ailerons 242 have been considered but it is unknown at this time whether they will be necessary, due to item 239. However, in the event that they were desirable, they would pivot as shown by arrow 243. FIG. 10 has been included to exhibit the extent to which the airfoil shape can be effected while preserving an unobjectionable shape for the overall vehicle.

FIG. 11 is exactly what its title says. This is how the system will operate from origin to destination, in normal day-to-day ground travel. The steps have been listed here for disclosure purposes. It is noted with emphasis that the last step of the method charges the PA1 and seals it off, such that when an operator starts the vehicle again, the first can be performed.

1.) Start-Up:
Depressurize pressure-accumulator PA1 through reversible pump-motor PM1.
Route generated electricity from PM1 to conductive coils (i), accelerating TF.
Open inlet and outlet of TF.
Commence combustion in combustor C.

2.) Run-Up and Hybrid Operation with P>Pmin:
Combust until $\omega 1$ (TF rotational velocity 1) and P1 are reached (load can be energized at this time)
When P=P1, close inlet and outlet of TF.
Compressors and turbines self-evacuate with assistance from pump and relieved (open) bias-seals.
Slowly expand gases in PA1 through PM1 (currently a motor-generator), electrically accelerating TF.
Deceleration of TF via energization of Load L.
Acceleration of TF via braking of Load L.
Successive reiteration of steps 2-5 and 2-6 until P=Pmin (or insufficient upcoming brakings foreseen).
Meanwhile, during quick-stops (brake-force required larger than reverse load capacity of load L):
Reverse PM1 (now a pump), utilizing supplemental brake-force to draw ambient air into PA (Supplemental braking requirements excessive) Activate service brake.
When P=Pmin OR $\omega 1 = \omega 1$ min (or insufficient upcoming brakings foreseen)—go to step 1-3.

3.) Shutdown/Parking:
Close (if open) inlet and outlet of TF.
Route electrical energy from TF to PM1.
Reverse PM1 to pump ambient air into PA.
When $\omega 1 = 0$, close PM1—resulting in hermetically sealed PA with sufficient charge to begin step 1.

FIGS. 12 and 13 get a little more involved, but again there is no need to explain an explanation. The best way to understand the first embodiment is to mentally trace these steps (above and below) and although these are special cases of usage, they fulfill the inventor's obligations of best mode, enablement, and industrial applicability. Each routine, as in scenarios 1-3 above, is best described by its heading.

4.) Starting from Road Travel with Moderate ω at Decision Moment (i.e. Typical Highway Lift-Off):
Close (if open) PM1, sealing PA1 (vertical take-off valve VTOV already closed).
Open (if not already open) inlet and outlet of TF and commence combustion (if not already combusting).
While P increases to Pmax, direct all electrical energy from TF to load L, accelerating vehicle.
When P=Pmax, cease combustion, close inlet and outlet of TF, open fan F inlet and flap panel to idle fan.
Electrically transfer all kinetic (rotational) energy from TF module 1 (TFM1) to TF module 2 (TFM2) and L.
When TFM1 and F are rotationally matched (via reduction gearing ratio), slide collar over trunnion.
Open PM1 to maximum throughput, transfer all energy from PM1 and TFM2 to TFM1 and L (until/unless vehicle velocity is near lift-off velocity, then deactivate L for duration of flight)
Open inlet and outlet to TF, commence combustion, positively drive F at lift-off thrust Although PM1 is still at max throughput, P will quickly reach Pmax).
Selectively open vertical take-off valve VTOV to position A to complement fan thrust and to waste-gate PM1.
If advantageous, momentarily (or for duration of lift-off) rotate VTOV partially/fully to position B and vertical take-off flap VTOF partially/fully upright to achieve "pop up" effect.

5.) Starting from Road Travel with Excessive ω at Decision Moment (i.e. Atypical Highway Lift-Off):
Reverse PM1 (now a pump) and slow TF electrically via PM1 and L, charging PA1 and accelerating vehicle.
When possible, open inlet and outlet of TF without combustion, further charging PA1 and slowing TF.
When ω falls to predetermined rate, commence combustion; Go to step 4-3.

6.) VTO with Moderate ω (i.e. Heliopad/Driveway Lift-Off):
Down flap panel, open fan inlet, open inlet and outlet of TF, commence combustion, charging PA1.
Direct some electrical energy from TF to reversed PM1 (now a pump), further charging PA1.
When P=Pmax, cease combustion, close inlet and outlet of TF, close PM1.
Electrically transfer all kinetic (rotational) energy from TF module 1 (TFM1) to TF module 2 (TFM2) and L.
Service brake applied (connect to front axle, PM1 pistons connect to generator) anytime prior to step 6-7.
When TFM1 is completely stopped, slide collar over trunnion, raise VTOFs to near-upright (fan nozzled down).
Open inlet and outlet to TF, commence combustion, continue to reverse PM1 via electricity from TF.
When P=Pvto, quickly cycle VTOV to position C and switch to thrust reverser on front inlet.
One VTOF has been left horizontal to keep down-thrust just shy of lift-off. It is now raised parallel to the others.

7.) VTO with High ω (i.e. Traffic Lift-Off):
Reverse PM1 (now a pump) and slow TF electrically via PM1, charging PA1.
When ω falls to predetermined rate, go to step 6-1.

8.) Pre-Planned or Taxi-to-Runway Flight (Since Significant Fuel is Consumed by VTO, this May be Common):
Perform steps 1-1 through 2-7 until on straightaway/runway, then perform steps 4-1 through 4-11.
With (GPS) knowledge of route (user's home and favorite lift-off), the computer can optimize fuel usage.

9.) Road Landing:
Obtain altitude and alignment just above roadway, level out and run TF and F at cruise.
Raise the central VTOF, or two outermost VTOFs, partway, to partially vector the thrust down Simultaneously with 9-2, cycle VTOV to position B.
Loss of thrust in 9-2 and 9-3 reduces lift. Vehicle descends onto air cushion created by downward thrust.
Several inches above roadway, level VTOFs and retract (toward fan) flap panel. Rear wheels touch down.
A moment behind step 9-5, cycle VTOV closed and cease combustion. Front wheels touch down.
Slide collar off trunnion, close fan inlet.
Braking load drives TF to high ω, go to step 2-5.
(it is uncertain at this time when, whether, and how PM1 should be utilized during this procedure)

10.) Vertical Landing:
Obtain approach position, attitude, and altitude.
Cycle VTOV to position B and all VTOF's to max upright position, vectoring all thrust and exhaust downward.
Pitch/roll/yaw nozzles PRYNs and TF driven selectively to stabilize speed, lift, pitch, roll, and yaw
Vehicle coasts through a deceleration and descent curve to arrive mostly slowed, above and just shy of LZ.
Cycle VTOV to position C and switch to thrust reverser on front inlet, bring horizontal velocity to zero above LZ.
Attenuate fuel-in until touchdown.
Slide collar off trunnion, close VTOV, retract (toward fan) flap panel, close fan inlet.
Go to either step 2-1 (to taxi or drive) or step 3-1 (to park).

11.) Other Features:
With GPS device, system can begin shedding energy a certain distance from one's destination. Docking station plug-ins allow vehicle to depart with maximum ω and P, such that lift-off happens fully fueled.

Although the method is extremely complicated, it is believed by the inventor that with the capabilities of modern computers, a simple device with very few moving parts and a complicated control method is preferable to an inordinately complicated device (think vertically thrusting fan geared to main drive shaft) with a simple control method. Some compromise must be made in pursuing vertical take-off and landing, and the inventor believes he has not put forth more requirements on the controller than a modern lap-top computer could handle.

Figure 14:
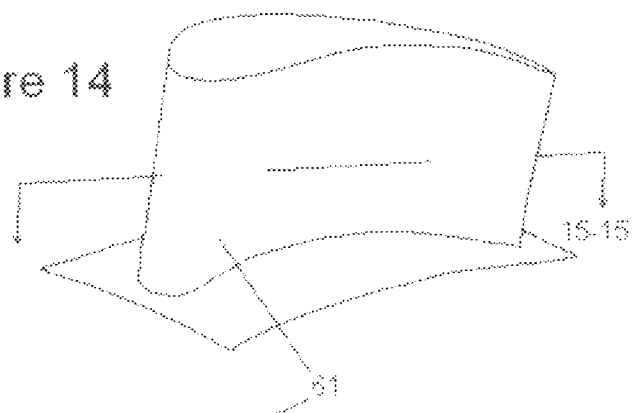
FIG. 14 is a view of a rotor vane of the axial compressor shown in FIG. 2.
Figure 15:
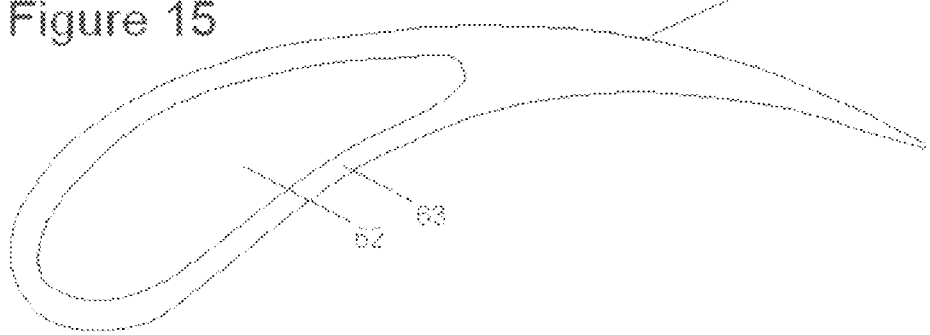
FIG. 15 is a cross-section taken along line 15-15 of FIG. 14, showing the magnetic core of the rotor vane of the axial compressor.

Continuing now to some essential attributes of the TF that were not mentioned earlier. FIG. 14 shows a typical axial-flow compressor vane. It is believed that no special shape will be needed for implementing the TF, however, as shown in FIG. 15, the inventor believes the preferred embodiment and best mode at this time are represented by a magnetic core 62 encased in the vane 63. U.S. Pat. No. 5,179,872 to Pernice provides for a magneto rotor having magnetic elements in pockets and the method of Pernice seems to be the best mode for achieving a workable model of FIG. 15. 62 would be an alloy of 33%-64% Nd/Fe (neodymium/iron) encased in, sintered in, or otherwise retained in aluminum vane 63. It is likely that the vast majority of TF will be of aluminum. As for the conductive coils in the casing of the TF, there are many ways to do this, and such is not the subject of the invention. What is important is that it be modified from encompassing the magneto or dynamo, as is usual in the art, and the loops tightened and multiplied to account for so many magnets. It goes without saying that in every aspect of this embodiment, the lightest materials are preferable.

Figure 16:
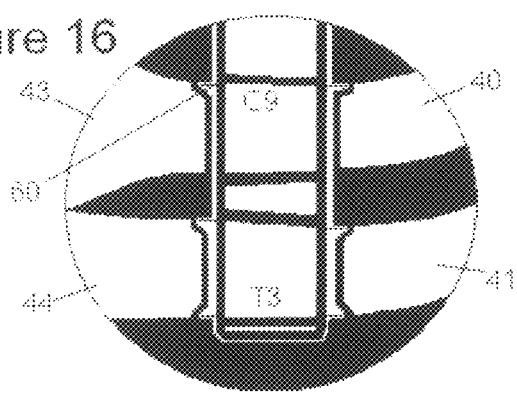
FIG. 16 is a close-up of area A of FIG. 2 showing the bias seals of the turbine flywheel module.

FIG. 16 shows a feature necessary for sealing air passages from nearby air passages within the TF. When combustion is stopped, typical seals would create friction, slowing the rotors and being a detriment to the flywheeling thereof. Therefore seals 60 (they are all over FIG. 2 but not shown, as they are small) are strategically place such that when combustion ceases and the pressures inside the system diminish, the seals disengage from their land. They would be biased away from the land like a Belleville washer spring and the high pressures during combustion would close them. This requires that an analysis be made of the pressures throughout the system, such that the seal always face the right direction. Once properly placed, it is inherent that once combustion ceases, the seals would open and, all gases would migrate from areas of high pressure to areas of low pressure, and almost all flow in radial passages should be outward. That way, the entire system can be evacuated by draining the combustor with evacuation pump 8.

Figure 17:
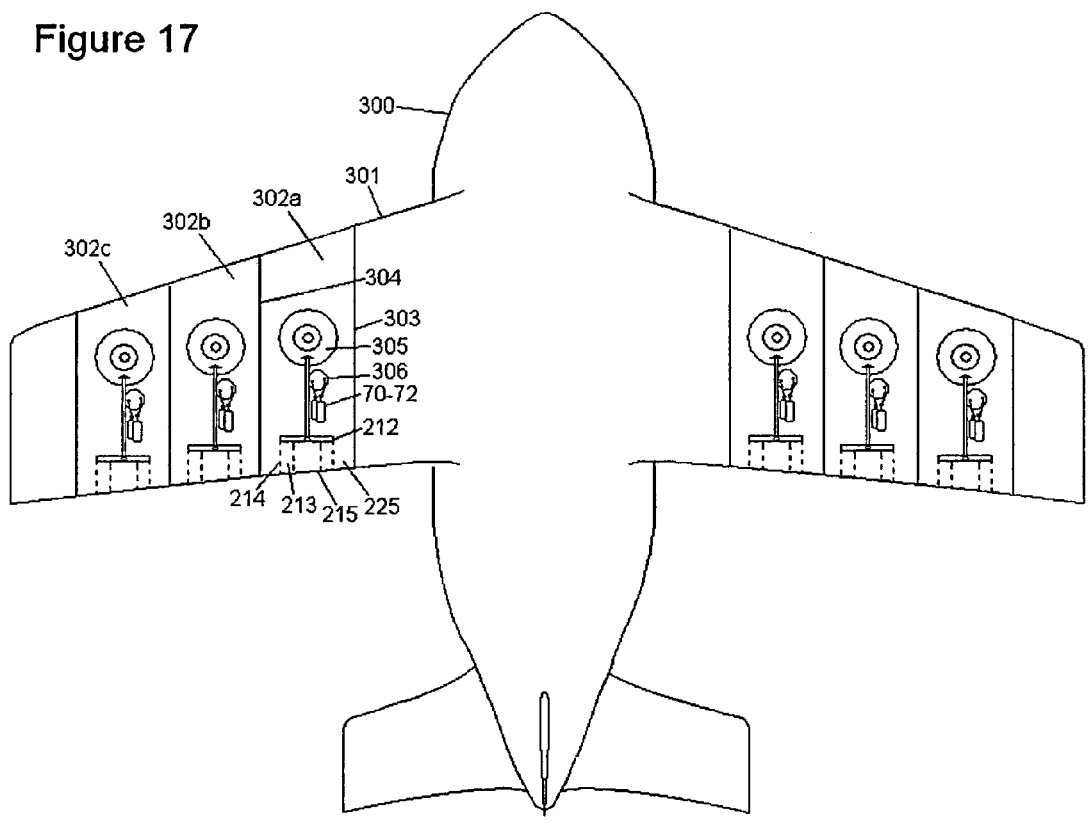
FIG. 17 is a top or bottom view of a VTOL aircraft of a second embodiment of the invention.

FIG. 17 shows the environment within which could be implemented through a second embodiment of the invention. The method is different and there are no magnets, but much of the rest of the system is the same. The concepts of the first invention have been extrapolated and modified to create an airplane capable of vertical take-off and landing. Aircraft 300 has within its wings 301 compartments 302a-c (and 302d-f in the other wing, not labeled). The compartments or chambers are separated by walls 303, 304 which might or might not have an opening for unobstructed migration of air between compartments. Gas turbine engine 305 is no longer called a TF and will be treated like any other gas turbine engine. Again, 70-72 are piston-cylinders that drive, like in PM1, a drive arrangement 306. Flaps and ailerons and panels 213-215 correspond to those in the first embodiment.

Figure 18:
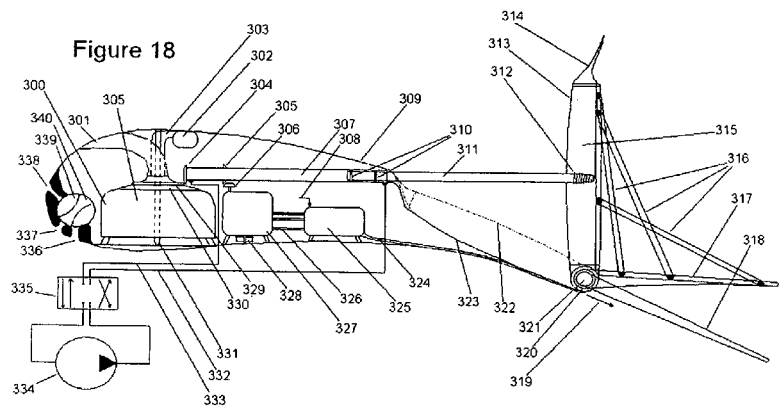
FIG. 18 is a cross-section taken along line 18-18 of FIG. 19, showing the in-wing orientation of the parts in the second embodiment of the invention.

FIG. 18 is a cross-section taken along the wing 301 of the aircraft 300. Intake 301 passes air to the gas turbine engine 305. For simplicity, the gas turbine engine of FIG. 2 will be assumed to be within the housing of 305, except now it sits upright on a vertical shaft 331 (this was the embodiment originally designed for embodiment 1, as evinced by the provisional application, but the bevel-gears and entailing mass were thought to be of diminishing returns, however it would spin like a top). An outlet 303 leads either to a simple outlet diffuser 302 which results in the exhaust pressurizing the wing, like the pressure accumulator of the first embodiment. At 308 air enters a series of piston-cylinders 325 either in series or parallel, as explained before, and with an outlet at 324. The piston rods 326 turn a crank within 327 which turns bevel gear which drives bevel gear 305 which is fixed for rotation on the main shaft 307. Main shaft 307 is also driven by a bevel gear 304 which is driven by a toothed annular strip 329 on top of the first compressor stage. The vertical take-off nozzle 339 passes air selectively from inside the wing, through bore 340 to outlets 336, 337, and 338. These correspond to positions A-C of the first embodiment. A hydraulic pump 334 drives through a reversing valve 335, a hydraulic system that drives inner shaft 311 telescopically inside outer shaft 307. The inner shaft 311 has seals 310 which allow it to act like a piston inside the outer shaft 307. The inner shaft is threaded and knobbed at the end, the threads being shown at 312. The fan cowl 315 has an implement 314 atop it for cooperating with the inner shaft 311 to open and close the fan. Dashed line 322 shows the fan cowling in its dropped position. This is a non-use position for the fan. VTO flaps 316 and flap panel 317, as well as ailerons 318, perform as described in the prior embodiment. 319 is the exhaust from the piston-cylinders. 320 is the hinge for the ailerons and 321 is the hinge for the flap panel.

Figure 19:
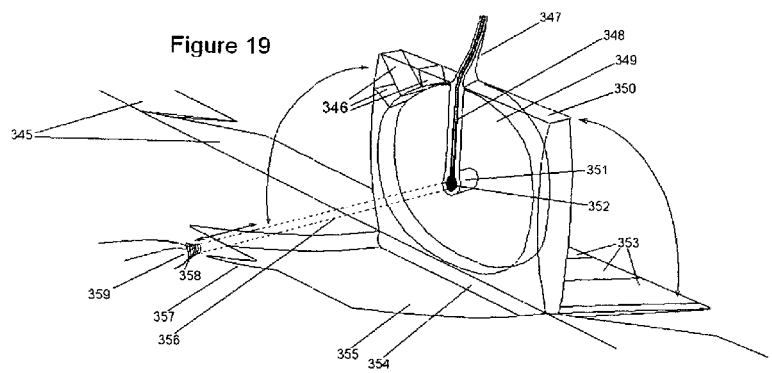
FIG. 19 is an elevational view from above the wing of the aircraft of the second embodiment of the invention, showing the fan, wing, ailerons, and VTO flaps of the second embodiment of the invention.

FIG. 18 begins to make sense when viewed in conjunction with FIG. 19. FIG. 19 shows the top of the wing, the niche 355 for accepting the cowling in the non-use position, the hinge 354 for the cowling, the fan 349, and flaps 353 in their non-VTO orientations. 346 shows that the cowling is not just a box but really, all the way around, hollow with strut-vanes that direct air and support the fan. 347 and 348 are directed to the aforementioned scheme of using the telescoping shaft to hide or expose the fan. 347 is a slot through which the tip of 311 is passed during manufacture. It tapers to a neck at the end of the threaded portion and a knob is supplied such that the neck slides within the knob, but the knob and threaded portion limit the movement of the slot on the shaft. As the shaft 311 extends, the ramp of 314, now seated in slot 357 with its tip wrapping around the neck of the shaft, will cause the cowling to raise and pivot up. When the cowling becomes upright and the shaft is now completely extended (reference numeral 356), the shaft begins to turn and screws the threaded portion into the hub of the fan. After operation, the pump-motor 327 can be reversed to unscrew it. Then, upon retraction, the knob will pull the slot with it, collapsing the fan into the wing. 345 shows the ailerons in their relation to the flaps 353. 358 and 359 are mounting arrangements for the shaft.

Inside the wing, the gas turbine engine reposes as shown in FIG. 20. FIGS. 20-22 serve to also show the different views of the combustor and will be nearly identical to how it will appear on the TF of FIG. 2. It is again here called TF because it is universal to the present application in all embodiments. TF has a top 363 of its housing which encases the centrifugal compressor and turbine, whose inlet and outlet are, respectively, 364 and 365. 361 corresponds to 33 in FIG. 2 and is the passage from the last compressor stage output into the combustor C or 362. 360 is the guide structure for leading air from the combustion chamber C to strike the vanes of T1. This is shown in FIG. 21 and includes vanes 372 and 373. 371 is the space between the outer wall of 362 and the combustion chamber geometry 370, and assists in surrounding the chamber with air to be led into it. FIG. 22 shows four guide structures 375 leading to four combustion areas 374. It is noted that the combustor inlet 361 would appear like a mirror image of FIG. 21 if portrayed.

At the top of FIG. 20 is an arrangement for placing all of the units within the wing in communication with each other. The inlet to the combustor communicates with this rail via path 369, as the turbine outlet does via 368. The combustor inlet 361 and outlet 360 communicate with the rail along path 366 and 367 and 366a and 367a, respectively. All four of these paths connect to the rail, which has a tube for each of the four airflows. 379 is a turreted, cylindrical valve with openings designed to transfer, at different degrees of rotation, the flow between any one passage and any other, and between any of them and, through the openings shown in the exposed portion of the rail, with the pressure accumulator. Each longitudinal zone of this valve will have a different set of borings, such that when the valve is turned a certain amount in one direction, the airflow seen in FIG. 23 becomes realized. Turning a little more would yield FIG. 24, and a little more would yield FIG. 25, and so on for further utilizations. The different schemes shown for driving different compressors with different turbines and different turbines or compressors with different pump-motors are by no means to be considered exhaustive. There are likely dozens of scenarios whereby the various compressors and turbines and pump-motors of the several units could be valved to enhance the efficiency. But to begin with, the maximum power output would be all units running full, with cowlings up and flaps down, for vertical take-off. The extra scenarios are envisioned for achieving different cruising speeds while minimizing fuel burn.

Figure 26:
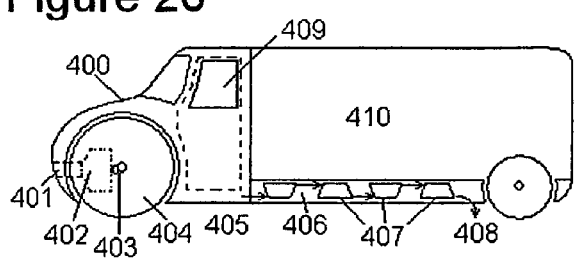
FIG. 26 is a side view of s vehicle utilized in implementing a third embodiment of the invention.
Figure 27:
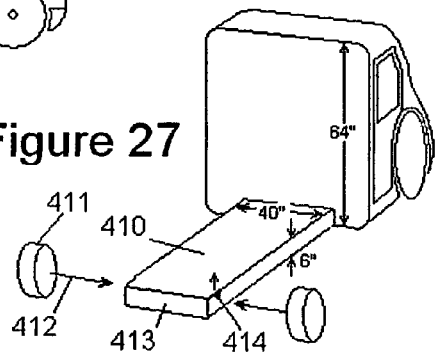
FIG. 27 is a rear elevational view of the vehicle utilized in implementing a third embodiment of the invention.

Claims 26 show a third embodiment of the invention. 402 is again the TF from the first embodiment. The inlet 401 has no special features and the turbine outlet could go anywhere into the body 400 which is a pressure accumulator except where the cabin resides. 403 is a drive arrangement and transmission for coupling the output shaft of the TF directly to the drive wheels of the vehicle, which is a little tow truck. It can hardly be considered a truck going by the dimensions shown in FIG. 27. 409 indicates the cabin and 405 indicates the airflow from the pressure accumulator to a bank of pump motors 407 stored in the tongue of the truck. The driven wheels are oversized relative to the truck because they must support the weight of a towed object, as described later. 410 is the bulk of the pressure accumulator. This is a collapsible chamber that when extended takes the form shown in FIG. 26 and when collapsed takes the shape shown in FIG. 27. The tongue 413, 406 is adapted to have its wheels 411 attached 412 and removed via a slide-up arrangement 414 which lets the axles slip up and out when a pin is pulled out.

Figure 28:
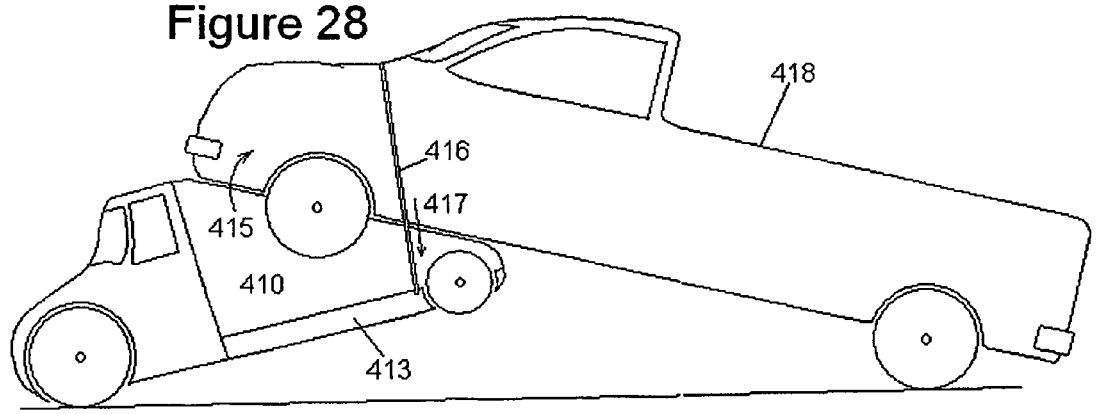
FIG. 28 is a side view of the vehicle utilized in implementing a third embodiment of the invention towing another vehicle.

In operation the truck drives around in hybrid mode, answering to a dispatch service. It should get the gas mileage of a very small car operating with the pressure accumulator 410 very large such that the TF pumps it full and it can drive around for a substantial time before requiring recharge. However, when the truck arrives at the scene of a vehicle 418 to be towed, the chamber collapses to the configuration shown in FIG. 27, and the tow truck assumes a position directly in front of the vehicle 418. The operator removes the wheels and the tongue sinks (any number of mechanisms can be used to soften this and/or protect the tongue) to the road and the tow truck backs up, resulting in the tongue extending partway under the vehicle 418 and between its front wheels. The operator throws a strap 416 over the hood of the vehicle 418 and ratchets it down as per the arrow 417. The TF then commences combustion and charges the pressure accumulator 410 against the undercarriage of the vehicle 418. Once a pressure of 3 or 5 atmospheres has been reached (3 atmospheres is 2 atm over barometric, which will yield 28 psi in force, easily jacking even the largest vehicle and if not the pressure will reach many more atmospheres before the pump/motor is activated), the expanding chamber 410 causes a torque 415 about the back rim of the tongue and the configuration shown in FIG. 28 will be soon reached. The tow truck now operates as does the first embodiment during flight, with adjustments for the transmission and other requisite accoutrement. The TF will be very powerful compared to the tow truck's weight itself, but would be set to match the horsepower of a large truck, which is generally less than 500 HP, such that the turbine should not have to be very large. The pump/motors will continue to operate in this condition but slightly differently from the first embodiment.

APPENDIX I

Of the types of expanders foreseen as the pump/motor (PM1) are:
a) a single piston-cylinder with one or more control valve(s);
b) multiple piston-cylinders with a single, or multiple, control valve(s);
c) a single centrifugal turbine of non-variable rotor and/or stator vanes;
d) a single centrifugal turbine with variable rotor and/or stator vanes;
e) multiple centrifugal turbines of non-variable rotor and/or stator;
f) multiple centrifugal turbines of variable rotor and/or stator vanes;
g) multiple axial turbines of variable or fixed rotor and/or stator vanes.
h) of the foregoing, a+b;
i) of the foregoing, a+c;
j) of the foregoing, a+d;
k) of the foregoing, a+e;
l) of the foregoing, a+f;
m) of the foregoing, a+g;
n) of the foregoing, b+c;
o) of the foregoing, b+d;
p) of the foregoing, b+e;
q) of the foregoing, b+f;
r) of the foregoing, b+g;
s) of the foregoing, c+d;
t) of the foregoing, c+e;
u) of the foregoing, c+f;
v) of the foregoing, c+g;
w) of the foregoing, d+e;
x) of the foregoing, d+f;
y) of the foregoing, d+g;
z) of the foregoing, e+f;
aa) of the foregoing, e+g;
ab) of the foregoing, a+h;
ac) of the foregoing, a+i, a+j, a+k, a+l, a+m, a+n, a+o, a+p, a+q, a+r, a+s, a+t, a+u, a+v, a+w, a+x, a+y, a+z, a+aa, or a+ab;
ad) of the foregoing, b+i, b+j, b+k, b+l, b+m, b+n, b+o, b+p, b+q, b+r, b+s, b+t, b+u, b+v, b+w, b+x, b+y, b+z, b+aa, or b+ab;
ae) of the foregoing, c+i, c+j, c+k, c+l, c+m, c+n, c+o, c+p, c+q, c+r, c+s, c+t, c+u, c+v, c+w, c+x, c+y, c+z, c+aa, or c+ab;
af) of the foregoing, d+i, d+j, d+k, d+l, d+m, d+n, d+o, d+p, d+q, d+r, d+s, d+t, d+u, d+v, d+w, d+x, d+y, d+z, d+aa, or d+ab;
ag) of the foregoing, e+i, e+j, e+k, e+l, e+m, e+n, e+o, e+p, e+q, e+r, e+s, e+t, e+u, e+v, e+w, e+x, e+y, e+z, e+aa, or e+ab;
ah) of the foregoing, e+i, e+j, e+k, e+l, e+m, e+n, e+o, e+p, e+q, e+r, e+s, e+t, e+u, e+v, e+w, e+x, e+y, e+z, e+aa, or e+ab;
ai) of the foregoing, f+i, f+j, f+k, f+l, f+m, f+n, f+o, f+p, f+q, f+r, f+s, f+t, f+u, f+v, f+w, f+x, f+y, f+z, f+aa, or f+ab;
aj) of the foregoing, g+i, g+j, g+k, g+l, g+m, g+n, g+o, g+p, g+q, g+r, g+s, g+t, g+u, g+v, g+w, g+x, g+y, g+z, g+aa, or g+ab.

I claim:
1. A method for operating a land vehicle or airplane vehicle, said land vehicle or airplane vehicle comprising a prime mover, an accumulation device, an expansion device, an electrical system, and having a vehicle velocity, the method comprising:
   directing gases from the prime mover to the accumulation device while combusting a fuel;
   directing said gases or part of said gases from said accumulation device to said expansion device;
   directing electrical energy from said expansion device to said prime mover;

wherein said prime mover has associated therewith a rate of rotation of an element of said prime mover and wherein said rate of rotation of said element of said prime mover increases while not combusting fuel due to said directing of electrical energy, and wherein said rate of rotation of said element of said prime mover is further increased by said electrical system in response to a decrease in said vehicle velocity by regeneratively capturing a braking energy created by said decrease in said vehicle velocity.

2. The method of claim 1 further comprising:
mechanically coupling said prime mover to a shafted or geared system that operates in parallel with, alternatively to, or complementary to said expansion device.

3. The method of claim 1 wherein:
said prime mover communicates with a load and said communicating with said load can be accomplished selectively and birectionally, wherein bidirectionally comprises sending electricity in two opposite directions between said prime mover and said load.

4. The method of claim 1 wherein:
said directing of electrical energy is accomplished along a bus in electrical communication with at least one rotor of said prime mover and a motor/generator coupled to at least one of said expansion device and a load.

5. The method of claim 1 further comprising:
reducing a pressure within an internal area of the prime mover to less than 1 atmosphere.

6. The method of claim 1 wherein said prime mover comprises:
a gas inlet;
a gas outlet;
at least one gas compression stage or turbine stage;
a flow path leading from said inlet to said outlet through said at least one compression stage or turbine stage;
wherein at least one of said at least one compression stage and said at least one turbine stage comprises:
a plurality of vanes;
a plurality of circumferentially spaced magnetic or electromagnetic elements.

7. The method of claim 1 further wherein:
said rate of rotation of said element of said prime mover is decreased by said electrical system in response to an increase in said vehicle velocity.

8. The method of claim 1 further comprising:
commencing combustion, ceasing combustion, and operating in a flywheeling mode said prime mover during a rotational acceleration sequence that accelerates the prime mover to a flywheeling rate of rotation about an axis while a pressure within said prime mover decreases to an evacuated level.

9. A method of operating an engine within or on a powered device, the engine having a combustion mode and a non-combustion mode, the engine further having at least one moving part, the method comprising:
a first step of beginning said combustion mode of the engine thereby giving a rotational velocity to said moving part of said engine, wherein said first rotational velocity is greater than zero;
upon reaching, as a result of said first step, a first rotational velocity, wherein said first rotational velocity is greater than zero, a second step of reducing a pressure within an internal area of said engine to a pressure state that is less than 1 atmosphere and creating a hermetic seal between an internal area of said engine and an area external to said engine;

a third step subsequent to said second step, said third step comprising electrically or magnetically increasing said rotational velocity, to a second rotational velocity higher than said first rotational velocity, wherein during said third step said pressure within said internal area of said engine remains at less than 1 atmosphere and said hermetic seal created during said second step is maintained through at least part of a duration of said third step.

10. The method of claim 9 further comprising:
regeneratively using deceleration of an element of said powered device to effect said increasing said rotational velocity during said non combustion mode.

11. The method of claim 9 further comprising:
decreasing said rotational velocity to accelerate an element of said powered device during said non-combustion mode.

12. The method of claim 9 wherein:
said increasing of said rotational velocity during said third step is accomplished via an electrical, magnetic, or electromagnetic element, structure, system, or configuration.

13. The method of claim 9 wherein said rotational velocity is the rotational velocity of at least one compression stage or at least one turbine stage: the method further comprising increasing or decreasing said rotational velocity by electrically influencing magnets circumferentially spaced on the engine or within said compression stage or said turbine stage.

14. The method of claim 9 further comprising:
passing gases through an everted flow path comprising at least one compression stage and at least one turbine stage, said at least one compression stage disposed coaxially and radially inwardly of said at least one turbine stage, or said at least one turbine stage disposed coaxially and radially inwardly of said at least one compression stage.

15. The method of claim 9 further wherein said engine comprises:
an air inlet and an exhaust outlet;
at least one gas compression stage or turbine stage;
a flow path leading from said inlet to said outlet through said at least one gas compression stage or turbine stage;
wherein at least one of said at least one gas compression stage and said at least one turbine stage comprises:
a plurality of vanes and a plurality of circumferentially spaced magnetic or electromagnetic elements;
wherein said engine communicates with a driven mechanical load in receipt of a force transmitted from at least one of said plurality of circumferentially spaced magnetic elements or electromagnetic elements.

16. The method of claim 9 further comprising:
coupling said engine to an auxiliary device and
causing combustion to directly drive said auxiliary device.

17. The method of claim 9 further comprising:
uncoupling said engine from an auxiliary device and subsequently repeating at least once said step of reducing the pressure within the internal area of said engine to the pressure state that is less than 1 atmosphere.

18. The method of claim 17 wherein:
said powered device is a wheeled vehicle, an agricultural or construction vehicle, an aircraft, a watercraft, a hovercraft, or a submersible and said auxiliary device comprises an implement, the method further comprising directly driving said implement during a secondary combustion mode.

19. The method of claim 18 wherein said implement comprises at least one of the following:
an axle with wheels;
a power takeoff shaft;
a hydraulic pump;
a fluid impeller;
an electrical generator;
supplemental traction-wheel drive elements, structure, system, or configuration;
reduction and/or overdrive gearing;
a flight propeller; and
drive wheels, wherein said drive wheels are also driven electrically by an associated device.

20. The method of claim 9 wherein:
said powered device contains an auxiliary device and said method comprises coupling said engine to directly drive said auxiliary device, wherein said engine comprises multiple rotors, each of said multiple rotors having a rotor speed, and wherein said auxiliary device has an idle or zero speed, wherein said coupling is accomplished by transferring rotational energy away from a first rotor toward a second rotor until a rotor speed of said first rotor is near or matched with said idle or zero speed of said auxiliary device, whereupon said auxiliary device is positively locked for rotation with said first rotor.

21. An engine of a machine, said engine comprising:
at least one compression stage;
at least one turbine stage;
a combustor;
an electrical, magnetic, or electromagnetic output drive connected to a physical load within or on said machine, wherein said engine is also within or on said machine and wherein said engine is spatially separate from and different from said physical load;
a pump in fluid communication with said at least one compression stage and said at least one turbine stage via said combustor for evacuating said at least one compression stage and said at least one turbine stage through said combustor;
electrical, magnetic, or electromagnetic means for accelerating said at least one of said at least one compression stage and said at least one turbine stage;
wherein said electrical, magnetic, or electromagnetic means for accelerating said at least one of said at least one compression stage and said at least one turbine stage is spatially separate from and different from said electrical, magnetic, or electromagnetic output drive.

22. An engine according to claim 21 further comprising:
an inlet and an outlet and a flow path leading from said inlet to said outlet through said at least one compression stage and said at least one turbine stage;
wherein at least one of said at least one compression stage and said at least one turbine stage comprises:
a plurality of vanes;
a plurality of circumferentially spaced magnetic or electromagnetic elements within or on the at least one gas compression stage or said at least one turbine stage;
wherein said engine communicates with said physical load via a force-transmitted from at least one of said plurality of circumferentially spaced magnetic or electromagnetic elements.

23. The engine according to claim 21 further comprising:
a passage for conducting exhaust gases from said engine to an accumulation device while said engine is combusting a fuel, wherein said combusting produces said exhaust gases, wherein an expansion device receives said exhaust gases from said accumulation device; and
apparatus for directing energy from the expansion device to said engine;
wherein said engine has associated therewith a rotational velocity of an element of said engine and said rotational velocity of an element of said engine increases while not combusting said fuel due to said directing.

24. An engine comprising:
a gas inlet;
a gas outlet;
at least one gas compression stage;
at least one turbine stage;
a flow path leading from said gas inlet to said gas outlet through said at least one gas compression stage or said at least one turbine stage;
wherein at least one of said at least one gas compression stage and said at least one turbine stage comprises:
a plurality of vanes that affect gaseous flow through the engine; and
a plurality of circumferentially spaced magnetic or electromagnetic elements within or on the at least one gas compression stage or said at least one turbine stage and an electrical control to selectively drive said at least one gas compression stage or said at least one turbine stage using the plurality of circumferentially spaced magnetic or electromagnetic elements;
wherein said engine communicates electrically with a driven mechanical load in receipt of an electrical force transmitted from at least one of said plurality of circumferentially spaced magnetic elements or electromagnetic elements;
wherein said driven mechanical load includes a system for converting said electrical force and at least one of a traction wheel and a tire and a regenerative brake; and
a pump in fluid communication with said at least one compression stage and said at least one turbine stage via said combustor for evacuating said at least one compression stage and said at least one turbine stage through said combustor.

25. The engine according to claim 24 wherein:
said flow path is everted, resulting in said at least one compressor stage being disposed coaxially and radially inwardly of said at least one turbine stage, or said at least one turbine stage disposed being coaxially and radially inwardly of said at least one compressor stage.

26. The engine according to claim 24 further comprising:
an accumulation device for accepting exhaust from the at least one compression stage or said at least one turbine stage and delivering it to a device or said engine.

27. The engine according to claim 24 further comprising:
an expander distinct from said engine for converting enthalpic energy from exhaust that has passed through said gas outlet.

28. The engine according to claim 24 further comprising:
apparatus for directing gases from the gas outlet to an accumulation device;
apparatus for directing gases from said accumulation device to an expansion device;
apparatus for directing energy from said expansion device to said engine; and
wherein said engine has associated therewith a rate of rotation of an element of said engine and said rate of rotation of an element of said engine increases while not combusting fuel due to said directing.

29. The engine according to claim 24 wherein:
said plurality of circumferentially spaced magnetic or electromagnetic elements generate a first torque; and
wherein said engine propulsively drives a wheeled vehicle, a tracked vehicle, an aircraft, a watercraft, or a submersible,
wherein said wheeled vehicle, tracked vehicle, aircraft, watercraft, or submersible has an implement that receives a higher torque than said first torque.

30. The engine according to claim 29 wherein the implement comprises at least one of the following:
a power takeoff shaft;
a hydraulic pump;
a fluid impeller;
an electrical generator;
supplemental traction-wheel drive elements;
a pulling device;
reduction gearing;
a flight propeller; and
drive wheels, wherein the drive wheels are also driven electrically.

31. The engine according to claim 24 wherein:
said gas inlet is adjacent to and concentric with said gas outlet.

32. The engine according to claim 24 wherein:
one of said gas inlet and said gas outlet communicates with a centrifugal compressor that is adjacent to, integral with, or affixed to a centrifugal turbine, wherein said centrifugal compressor is concentric with said centrifugal turbine.

33. The engine according to claim 24 wherein:
said engine comprises seals and lands wherein said seals are normally biased away from said lands, but wherein said seals contact the lands when one or both of said at least one gas compression stage or turbine stage creates a pressure differential across said seals.

34. The engine according to claim 24 wherein:
the engine has a first rotor rotatable relative to a second rotor;
wherein only one of said first rotor and said second rotor has a mechanical output.

35. The engine according to claim 24 wherein:
the engine has a first rotor rotatable relative to a second rotor;
wherein said first rotor rotates in a first direction around an axis and said second rotor rotates in a second direction around said axis, wherein said second direction is opposite to said first direction.

* * * * *